United States Patent [19]
Hayase

[11] Patent Number: 5,965,663
[45] Date of Patent: *Oct. 12, 1999

[54] RESIN COMPOSITION AND RESIN-MOLDED TYPE SEMICONDUCTOR DEVICE

[75] Inventor: Rumiko Hayase, Yokohama, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/653,467

[22] Filed: May 24, 1996

[30] Foreign Application Priority Data

Jun. 6, 1995 [JP] Japan .................................... 7-139188
Mar. 8, 1996 [JP] Japan .................................... 8-051424

[51] Int. Cl.$^6$ ............................ C08L 65/02; C08L 81/06; C08G 75/00
[52] U.S. Cl. ........................... 524/609; 524/611; 525/391; 525/534; 525/535; 525/536; 525/537
[58] Field of Search ..................................... 524/609, 611, 524/534–537; 525/391

[56] References Cited

U.S. PATENT DOCUMENTS

| | | | |
|---|---|---|---|
| H521 | 9/1988 | Fan ........................................... | 525/535 |
| 3,887,582 | 6/1975 | Holub et al. ............................. | 524/600 |
| 4,093,600 | 6/1978 | Fan et al. ................................. | 525/534 |
| 4,550,140 | 10/1985 | Rimsa et al. ............................ | 524/609 |
| 4,772,653 | 9/1988 | McKenna ................................. | 524/427 |
| 4,871,816 | 10/1989 | Percec et al. ............................ | 528/31 |
| 5,091,480 | 2/1992 | Percec ..................................... | 525/535 |
| 5,093,435 | 3/1992 | Harris et al. ............................ | 525/534 |

*Primary Examiner*—Tae Yoon
*Attorney, Agent, or Firm*—Oblon, Spivak, McClelland, Maier & Neustadt, P.C.

[57] ABSTRACT

A resin composition comprising (a) polyarylene polyether represented by the general formula of $Z_1$-(polyarylene polyether) chain-$Z_1'$ (wherein $Z_1$ and $Z_1'$ denote individually a monovalent organic group containing a cross-linkable unsaturated carbon-carbon linkage), and (b) an inorganic filler.

14 Claims, 1 Drawing Sheet

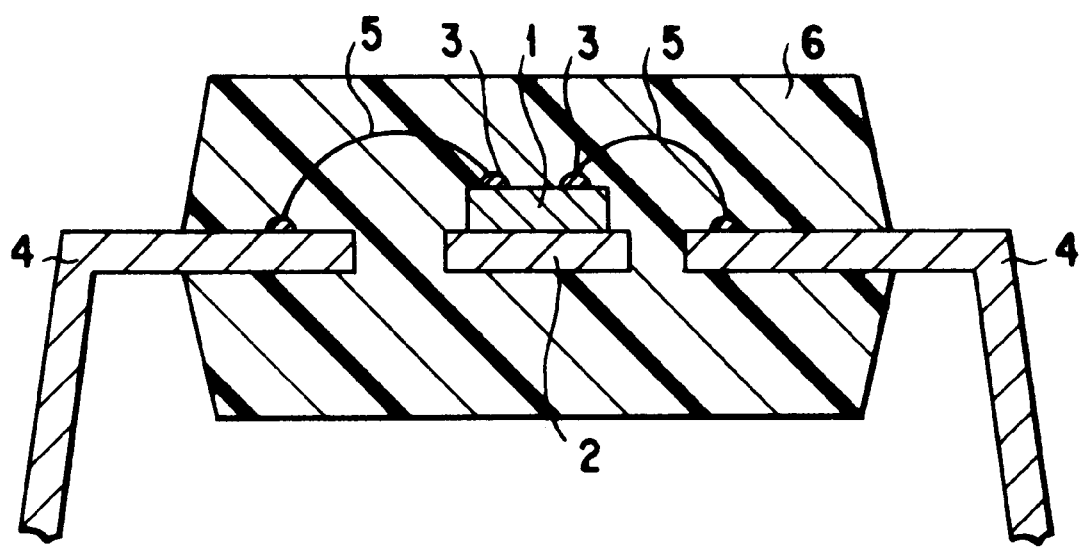
FIGURE

RESIN COMPOSITION AND RESIN-MOLDED TYPE SEMICONDUCTOR DEVICE

BACKGROUND OF THE INVENTION

1. Field of the Invention

This invention relates to a resin composition and a resin-molded type semiconductor device wherein a semiconductor chip is sealed with the resin composition being cured.

2. Description of the Related Art

With the current trend to achieve an increased integration of a semiconductor element, the miniaturization of various function units of the element and the enlargement of the element per se are now progressing. For the purpose of sealing such semiconductor chip with a resin composition, an epoxy resin composition comprising a thermosetting epoxy resin as a main component and a phenol resin as a curing agent has been extensively employed.

For example, a gate array of so-called ASIC (Application Specific IC) or a surface mount type package represented by a standard cell type LSI has been produced by making use as a sealing resin of an epoxy resin. In the process of mounting these semiconductor devices on a substrate, a thermal treatment such as a vapor phase reflow, an infra-red ray reflow and a solder dipping is performed. In this thermal treatment, the package is exposed to a high temperature in the order of 215 to 260° C., so that a trace of water which has been penetrated into the package is suddenly vaporized, thus often giving rise to the generation of a crack in the sealing resin.

When the crack is extended to the external surface of the sealing resin, the moisture resistance reliability of resin-molded type semiconductor device will be damaged raising a serious problem. Moreover, when a crack is generated in the sealing resin, the resin will be caused to swell resulting in the deformation of the package, thus possibly making it difficult to mount the package on a substrate.

Furthermore, when such a defective package is mounted on a substrate, various problems including a cracking may be brought about even in the interior of the semiconductor chip sealed with a resin. For example, PSG (phosphosilicate glass) or SiN (silicon nitride) which is used as a passivation film for a metallic interconnecting wiring layer formed of aluminum for example may be cracked, or the breakage of a gold bonding wire may be caused.

To solve these problems, there have been various demands as described below in the manufacture of a resin molded package in particular of large size, these demands being mainly related to the sealing resin.

(1) The stress to be laid upon inner devices by the sealing resin should be minimized, and the adhesion between the sealing resin and a lead frame or a film such as PSG film, SiN film or polyimide film formed on a semiconductor chip should be improved.

(2) The sealing resin should be excellent in heat resistance, i.e., sufficiently high in high-temperature strength or in high-temperature strength under moisture absorption so as to withstand the mounting temperature of the package. At the same time, the hygroscopicity of the sealing resin should be as low as possible.

In view of these demands, there has been studied to use, as a main component of a sealing resin composition for a semiconductor chip, a heat-resistive thermoplastic resin of so-called engineering plastic such as PPS (polyphenyl sulfide) resin, PPE (polyphenylene ether) or liquid crystal polymer. However, it is required to heat them at a relatively high temperature in the range of 200 to 300° C. in order to melt-molding these resins. Moreover, there is a problem that the melt viscosity of these resins is higher than that of epoxy resin. Since these resins are accompanied with these problems, the molding of them is very difficult as compared with the conventional sealing resin composition containing epoxy resin.

The conventional sealing resin composition for a semiconductor chip generally contains about 50 to 85 parts by weight of an inorganic filler in order to lower the thermal expansion coefficient of the sealing resin composition and at the same time to improve the thermal shock resistance of the sealing resin composition. However, if the thermal shock resistance of the aforementioned heat resistance thermoplastic resin is to be improved by the addition in the equal volume of inorganic filler, the melt viscosity of the sealing resin would be further increased thus deteriorating the flowability of the sealing resin, thus inviting the drifting of bonding wire or the dislocation of the bed. On the other hand, if a resin of lower molecular weight is employed, the melt viscosity of the sealing resin may be lowered thereby improving the moldability of the sealing resin, but the strength and heat resistance of the sealing resin would be deteriorated.

SUMMARY OF THE INVENTION

Accordingly, an object of the present invention is to provide a resin composition which is excellent in moldability and heat resistance, and at the same time low in hygroscopicity or water absorption.

Another object of the present invention is to provide a resin-molded type semiconductor device which is excellent in heat resistance and thermal shock resistance, and at the same time high in moisture resistance reliability.

Namely, according to the present invention, there is provided a resin composition comprising: (a) polyarylene polyether represented by the general formula of $Z_1$-(polyarylene polyether) chain-$Z_1'$ (wherein $Z_1$ and $Z_1'$ denote individually a monovalent organic group containing a cross-linkable unsaturated carbon-carbon linkage); and (b) an inorganic filler.

Furthermore, according to the present invention, there is provided a resin composition comprising: (a) polyarylene polyether represented by the general formula of $Z_2$-(polyarylene polyether) chain-$Z_2'$ (wherein $Z_2$ and $Z_2'$ denote individually a monovalent organic group containing an epoxy group); (b) a curing agent; and (c) an inorganic filler.

According to the present invention, there is further provided a resin composition comprising: (a) a compound having two or more epoxy groups in its molecule; (b) polyarylene polyether represented by the general formula of $Z_3$-(polyarylene polyether) chain-$Z_3'$ (wherein $Z_3$ and $Z_3'$ denote individually a monovalent organic group containing hydroxyl or carboxylic group); and (c) an inorganic filler.

Further, according to the present invention, there is also provided a resin composition comprising: (a) polyarylene polyether represented by the general formula of $Z_1$-(polyarylene polyether) chain-$Z_1'$ (wherein $Z_1$ and $Z_1'$ denote individually a monovalent organic group containing a cross-linkable unsaturated carbon-carbon linkage); (b) an inorganic filler; and (c) a compound containing at least one organic group having a cross-linkable unsaturated carbon-carbon linkage in its molecule, the compound having a molecular weight of 5,000 or less.

Still further, according to this invention, there is also provided a resin composition comprising:

(a) polyarylene polyether having a siloxane bond on a backbone chain thereof and a thermally cross-linkable organic group at a terminal thereof; and (b) an inorganic filler.

Moreover, according to this invention, there is further provided a resin-molded type semiconductor device comprising a semiconductor chip and a resin layer for sealing the semiconductor chip, wherein the resin layer is formed of a cured material of any one of aforementioned resin compositions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGURE is a longitudinal sectional view showing one example of the resin-molded type semiconductor device.

DETAILED DESCRIPTION OF THE PREFERRED EMBODIMENT

This invention will be further explained in detail with reference to the following preferred embodiments.

The resin composition according to a first embodiment of this invention is featured in that the resin composition comprises (a) polyarylene polyether represented by the general formula of $Z_1$-(polyarylene polyether) chain-$Z_1'$ (wherein $Z_1$ and $Z_1'$ denote individually a monovalent organic group containing a cross-linkable unsaturated carbon-carbon linkage); and (b) an inorganic filler.

The (a) component formed of polyarylene polyether can be represented by the general formula of $Z_1$-(O—Ar)n—$OZ_1'$. Herein Ar denotes bivalent aromatic group. This Ar may be a repetition of different kinds of aromatic groups. Specific examples of the (a) component are polyarylene polyethers represented by the following general formulas (1) to (8). Among them, the polyarylene polyethers represented by the general formulas (1), (6), (7) and (8) which do not contain an aliphatic group in the repetition moiety thereof are more preferable in view of the flame resistance thereof.

Z—(O—Ph—SO₂—Ph)n—OZ'  (1)

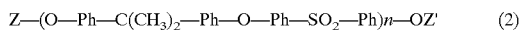

Z—(O—Ph—C(CH₃)₂—Ph—O—Ph—SO₂—Ph)n—OZ'  (2)

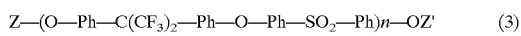

Z—(O—Ph—C(CF₃)₂—Ph—O—Ph—SO₂—Ph)n—OZ'  (3)

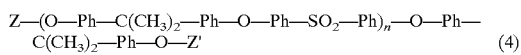

Z—(O—Ph—C(CH₃)₂—Ph—O—Ph—SO₂—Ph)n—O—Ph—C(CH₃)₂—Ph—O—Z'  (4)

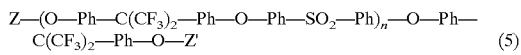

Z—(O—Ph—C(CF₃)₂—Ph—O—Ph—SO₂—Ph)n—O—Ph—C(CF₃)₂—Ph—O—Z'  (5)

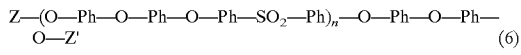

Z—(O—Ph—O—Ph—O—Ph—SO₂—Ph)n—O—Ph—O—Ph—O—Z'  (6)

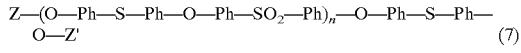

Z—(O—Ph—S—Ph—O—Ph—SO₂—Ph)n—O—Ph—S—Ph—O—Z'  (7)

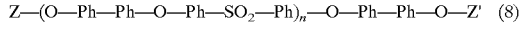

Z—(O—Ph—Ph—O—Ph—SO₂—Ph)n—O—Ph—Ph—O—Z'  (8)

wherein Ph represents benzene ring, n is a integer. The preferable range of n is from 1 to 30 from the standpoint of moldability. If the number of n exceeds over 30, the melt viscosity of the polyarylene polyether may become high and it may be difficult to mold.

The molecular weight of (a) component, i.e., polyarylene polyether should preferably be 300 to 50,000, more preferably 500 to 30,000, most preferably 1,000 to 15,000. If the molecular weight of (a) component is less than 300, the resultant cured product may become brittle. On the other hand, if the molecular weight of (a) component exceeds over 50,000, the melt viscosity thereof may become too high to mold.

The polyarylene polyether chain moiety may or may not contain one or more substituent groups. For example, the polyarylene polyether chain moiety may contain halogen (for example, chlorine, bromine and fluorine), alkyl group containing 1 to 4 carbon atoms, alkoxyl group containing 1 to 4 carbon atoms, phenyl group and other inert substituents. Preferable examples of the monovalent organic group $Z_1$ and $Z_1'$ containing a cross-linkable unsaturated carbon-carbon linkage are alkenyl group, alkynyl group or alkynyl aryl group. Specific examples of $Z_1$ and $Z_1'$ are vinyl, allyl, acryl, methacryl, styryl and propargyl, etc.

Followings are specific examples of polyarylene polyether.

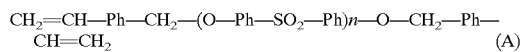

CH₂=CH—Ph—CH₂—(O—Ph—SO₂—Ph)n—O—CH₂—Ph—CH=CH₂  (A)

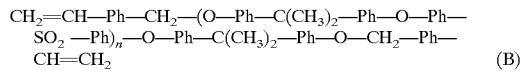

CH₂=CH—Ph—CH₂—(O—Ph—C(CH₃)₂—Ph—O—Ph—SO₂—Ph)n—O—Ph—C(CH₃)₂—Ph—O—CH₂—Ph—CH=CH₂  (B)

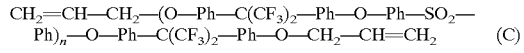

CH₂=CH—CH₂—(O—Ph—C(CF₃)₂—Ph—O—Ph—SO₂—Ph)n—O—Ph—C(CF₃)₂—Ph—O—CH₂—CH=CH₂  (C)

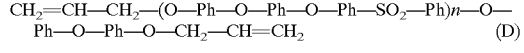

CH₂=CH—CH₂—(O—Ph—O—Ph—O—Ph—SO₂—Ph)n—O—Ph—O—Ph—O—CH₂—CH=CH₂  (D)

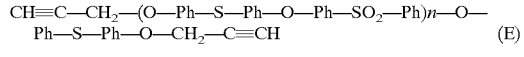

CH≡C—CH₂—(O—Ph—S—Ph—O—Ph—SO₂—Ph)n—O—Ph—S—Ph—O—CH₂—C≡CH  (E)

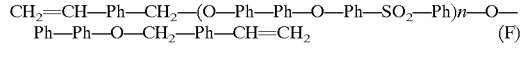

CH₂=CH—Ph—CH₂—(O—Ph—Ph—O—Ph—SO₂—Ph)n—O—Ph—Ph—O—CH₂—Ph—CH=CH₂  (F)

The polyarylene polyether represented by the general formula of $Z_1$-(polyarylene polyether) chain-$Z_1'$ can be synthesized by a method described for example in Japanese Patent Publication H1-42289.

Namely, first of all, a bisphenol compound is reacted with alkaline metal hydroxide to obtain an alkaline metal salt of bisphenol. In this case, there is no restriction as for the bisphenol compound to be employed. However, among them, hydroquinone, bisphenol A, 4,4'-dihydroxyphenyl ether, 4,4'-dihydroxyphenyl methane, 4,4'-dihydroxyphenyl sulfide, 2,2'-bis(4-hydroxydiphenyl) hexafluoropropane and 4,4'-dihydroxyphenyl sulfone are preferable.

More specifically, these bisphenol compounds are dissolved into a mixed solvent consisting of a solvent such as N-methylpyrolidone, N,N-dimethylacetamide or dimethylsulfoxide and a solvent which is capable of forming an azeotropic mixture with water such as toluene, xylene, benzene and chlorobenzene to obtain a mixed solution to which an alkaline metal hydroxide such as sodium hydroxide or potassium hydroxide is added, and then heated for about 20 to 240 minutes at a temperature of about 110° C. to 150° C. to obtain an alkaline metal salt of bisphenol compound while removing water and the azeotropic agent. It is also possible to obtain an alkaline metal salt of bisphenol compound by reacting a bisphenol with an alkaline metal hydride such as sodium hydride or with metallic sodium.

Then, an excessive amount of the alkaline metal salt of bisphenol compound is reacted with a dihalogen compound to obtain polyarylene polyether having an alkaline metal salt as a terminal group. In this case, the alkaline metal salt of bisphenol should preferably be employed in a stoichiometrically excessive amount in the reaction, i.e., about 1.02 to 2.00 moles, more preferably 1.02 to 1.50 moles, most preferably 1.02 to 1.20 moles per 1 mole of the dihalogen compound. As for the dihalogen compound, an aromatic compound having a bivalent activated halogen-substituted group may be used. Typical examples of such an aromatic compound are 4,4'-dichlorodiphenyl sulfone, 4,4'-difluorodiphenyl sulfone, 4,4'-dichlorodiphenyl disulfide and 4,4'-dibromodiphenyl ether.

This reaction can be performed by heating the reaction mixture at a temperature of about 150° C. to 170° C. for about 1 to 30 hours to obtain polyarylene polyether having an alkaline metal salt as a terminal group.

Finally, the hydroxyl group attached to the terminal of the alkaline metal salt molecule is then reacted with a halogen compound having a cross-linkable unsaturated carbon-carbon linkage thereby to introduce the cross-linkable unsaturated carbon-carbon linkage into the terminal site of the polymer. Then, the reaction solution is filtered to remove salts, and filtrate is poured into water, methanol, ethanol or isopropanol to precipitate a polymer, thus obtaining polyarylene polyether. This reaction can be performed at a temperature ranging from room temperature to about 120° C., completing the reaction in about 1 to 20 hours if a preferable temperature is selected.

The halogen compound having a cross-linkable unsaturated linkage which is useful in this case may be selected from aryl chloride, aryl bromide, propargyl bromide, acrylic chloride, methacrylic chloride, chloromethyl vinylsilane, vinylbenzyl chloride and 2-chloroethyl vinylether.

Instead of using a halogen compound, the introduction of the unsaturated carbon-carbon linkage may be performed by allowing the terminal hydroxyl group of the polymer to be reacted with an acid anhydride having a cross-linkable unsaturated carbon-carbon linkage such as maleic anhydride, citraconic anhydride, tetrahydrophthalic anhydride, methyl-5-norbornene-2,3-dicarboxylic anhydride and 5-norbornene-2,3-dicarboxylic anhydride.

In the resin composition according to the first embodiment of this invention, the content of the (a) component should preferably be about 5 to 60 parts by weight per 100 parts by weight of the entire resin composition. If the content is less than 5 parts by weight, the effect of this invention can not be sufficiently attained. On the other hand, if the content is over 60 parts by weight, the thermal expansion coefficient of the cured material may become so large that a sufficient thermal shock resistance can not be obtained when the resin composition is applied to a resin-molded type semiconductor device.

As for inorganic filler constituting (b) component of the resin composition according to the first embodiment of this invention, quartz glass, crystalline silica, fused silica, zircon, alumina, calcium silicate, barium sulfate, magnesite, clay, kaolin, talc, mica, glass fibers, ceramic fibers, silicon carbide, silicon nitride, aluminum nitride, titanium white, calcium carbonate and gypsum can be employed. Among them, quartz glass, crystalline silica and fused silica are more preferable, since they can be easily filled in large amount in the resin composition and are excellent in lowering the water absorption of the resin composition. As for the crystalline silica and fused silica, although there are two types in the shape of them, i.e., a crushed silica and a spherical silica, they may be used by suitably mixing them.

The mixing ratio of the inorganic filler should preferably be 40 to 95 parts by weight per 100 parts by weight of the entire resin composition. If the mixing ratio is less than 40 parts by weight, the thermal expansion coefficient of the cured material may become so large that a sufficient thermal shock resistance can not be obtained when the resin composition is applied to a resin-molded type semiconductor device. On the other hand, if the content is over 95 parts by weight, the flowability of the resin composition so deteriorated that the drifting of bonding wire or the dislocation of the bed during the molding step thereof may be caused to occur.

When the resin composition according to the first embodiment of this invention is further added with a maleimide resin, the heat resistance and adhesion to a semiconductor chip of the resin composition can be further promoted. Examples of maleimide resin useful in this case are N,N'-phenylene bismaleimide, N,N'-hexamethylene bismaleimide, N,N'-diphenylmethane bismaleimide, N,N'-oxy-di-p-phenylene bismaleimide, N,N'-4,4'-benzophenone bismaleimide, N,N'-pdiphenylsulfone bismaleimide, N,N'-(3,3'-dimethyl) methylene-di-p-phenylene bismaleimide, poly(phenylmethylene) polymaleimide, 2,2-bis(4-phenoxyphenyl)propane-N,N'-bismaleimide, bis(4-phenoxyphenyl) sulfone-N,N'-bismaleimide, 1,4-bis(4-phenoxy)benzene-N,N'-bismaleimide, 1,3-bis(4-phenoxy)benzene-N,N'-bismaleimide, and 1,3-bis(3-phenoxy)benzene-N,N'-bismaleimide. These maleimides may be used singly or in combination of two or more kinds.

Since maleimide resin can be crosslinked as it is heated without requiring the addition of a curing agent, the resin composition can be formulated with the (a) component, a maleimide resin and an inorganic filler. However, the addition of a curing agent is preferable in view of shortening the curing time.

As for the curing agent for maleimide resin, a phenol resin such for example as novolak type phenol resin can be used. It is also possible to employ a phenol resin containing a group which is reactive to the maleimide resin such as amino group, allyl group, vinyl group and acryl group may be employed.

As for the novolak type phenol resin, any compound having two or more phenolic hydroxyl groups in its one molecule can be used. For example, phenol novolak resin, cresol novolak resin, t-butylphenol novolak resin, nonylphenol novolak resin, phenol aralkyl resin and dicyclopentadienephenol novolak resin can be used. Among them, phenol novolak resin is preferable in view of moldability and mechanical strength thereof.

Specific examples of phenol novolak resin are Shounol BRG-555 (Shouwa Kobunshi Co., softening point:68° C., melt viscosity:2.4 ps at 125° C.), Shounol BRG-556 (Shouwa Kobunshi Co., softening point:80° C., melt viscosity:1.8 ps at 150° C.), Shounol BRG-557 (Shouwa Kobunshi Co., softening point:87° C., melt viscosity:3.0 ps at 150° C.), Shounol BRG-558 (Shouwa Kobunshi Co., softening point:97° C., melt viscosity:6.2 ps at 150° C.), Barcam TD-2131 (Dainihon Ink Co., softening point:80° C., melt viscosity:3.3 ps at 150° C.), and Barcam TD-2093 (Dainihon Ink Co., softening point:100° C., melt viscosity:30 ps at 150° C.).

As for phenol resin having allyl group, SH-140A (Mitsubishi Yuka Co.), SH-150A (Mitsubishi Yuka Co.), and XPSF-4488 (Gunei Kagaku Co.) can be used.

The mixing ratio of these phenol resins should preferably be 10 to 50 parts by weight per 100 parts by weight of the maleimide resin according to the first embodiment of this invention. If the mixing ratio is less than 10 parts by weight, the curing time of the resin composition can not be sufficiently shortened. On the other hand, if the content is over 50 parts by weight, the curing properties of the resin composition may become deteriorated, thus lowering the heat resistance of the cured product to be finally molded.

The combined content of maleimide resin and phenol resin in the resin composition according to the first embodiment of this invention should preferably be not more than 80 parts by weight per 100 parts by weight of the total amount of the (a) component, maleimide and phenol resin. If the combined content of maleimide resin and phenol resin is larger than this upper limit, the resultant cured product of the resin composition may become brittle.

The resin composition according to the first embodiment of this invention may contain a curing catalyst for promoting the curing reaction of polyarylene polyether and maleimide resin. For example, a peroxide or an azo compound may be used as the curing catalyst.

Examples of peroxide are diallyl peroxides, peroxide esters, diacyl peroxides, hydroperoxides, ketone peroxides and peroxyketals. Specific examples of them are benzoyl peroxide, parachlorobenzoyl peroxide, 2,4-dichlorobenzoyl peroxide, caprylyl peroxide, lauroyl peroxide, acetyl peroxide, methylethylketone peroxide, cyclohexanone peroxide, bis(1-hydroxycyclohexyl peroxide), hydroxyheptyl peroxide, t-butylhydroperoxide, p-methanehydroperoxide, cumenehydroperoxide, 2,5-dimethylhexyl-2,5-dihydroperoxide, di-t-butyl peroxide, dicumyl peroxide, 2,5-dimethyl-2,5di(t-butylperoxy) hexane, 2,5-dimethylhexyl-2,5-di(peroxybenzoate), t-butylperbenzoate, t-butylperacetate, t-butylperoctoate, t-butylperoxyisobutylate, and di-t-butylperphthalate.

As for the azo compound, azobisisobutylonitrile, 2,2'-azobispropane, m,m'-azoxystyrene or hydrazone may be used.

As for the curing catalyst, a latent curing catalyst such as HX3722 (Asahi Kasei Co.) or MY-25 (Ajinomoto Co.) may be used.

When maleimide resin is incorporated into the resin composition, a basic catalyst is also effective in promoting the curing reaction of the maleimide resin. Examples of such a basic catalyst are organic phosphine compounds, imidazole compounds or the derivatives thereof, DBU (1,8-diazabicyclo(5,4,0) undecene-7) or phenol salt of DBU.

Examples of the phenol salt of DBU include SA-853 (Sanapro). Examples of organic phosphine are trimethyl phosphine, triethyl phosphine, tributyl phosphine, triphenyl phosphine, tri(p-methylphenyl) phosphine, tri(nonylphenyl) phosphine, methyldiphenyl phosphine, dibutylphenyl phosphine, tricyclohexyl phosphine, 1,2-bis (diphenylphosphine) ethane, and bis(diphenylphosphine) methane.

Examples of imidazole compound are 2-methylimidazole, 2,4-dimethylimidazole, 2-ethyl-4-methylimidazole, 2-phenylimidazole, 2-phenyl-4-methylimidazole, and 2-heptadecylimidazole.

The content of the curing catalyst in the resin composition according to the first embodiment of this invention should preferably be 0.1 to 10 parts by weight per 100 parts by weight of the total amount of the (a) component, maleimide and phenol resin. If the content of curing catalyst is less than 0.1 part by weight, the curing of the resin composition may become insufficient so that the electric properties of the resultant cured product, and hence the electric properties of resin-molded semiconductor device may be deteriorated. On the other hand, if the content of the curing catalyst exceeds over 10 parts by weight, the heat resistance, moisture resistance and electric properties of the resultant cured product of the resin composition may be deteriorated. The preferable content of the curing catalyst is 0.5 to 5 parts by weight per 100 parts by weight of the total amount of the (a) component, maleimide and phenol resin.

The resin composition according to a second embodiment of this invention is featured in that the resin composition comprises (a) polyarylene polyether represented by the general formula of $Z_2$-(polyarylene polyether) chain-$Z_2'$ (wherein $Z_2$ and $Z_2'$ denote individually a monovalent organic group containing epoxy group); (b) a curing agent; and (c) an inorganic filler.

The (a) component formed of polyarylene polyether can be represented by the general formula of $Z_2$—(O—Ar)n—$OZ_2'$. Herein Ar denotes bivalent aromatic group. This Ar may be a repetition of different kinds of aromatic groups. Specific examples of the (a) component are polyarylene polyethers represented by the following general formulas (G) to (L).

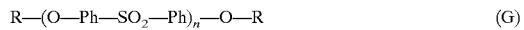

R—(O—Ph—SO$_2$—Ph)$_n$—O—R  (G)

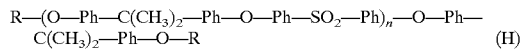

R—(O—Ph—C(CH$_3$)$_2$—Ph—O—Ph—SO$_2$—Ph)$_n$—O—Ph—C(CH$_3$)$_2$—Ph—O—R  (H)

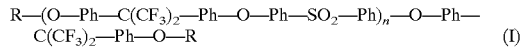

R—(O—Ph—C(CF$_3$)$_2$—Ph—O—Ph—SO$_2$—Ph)$_n$—O—Ph—C(CF$_3$)$_2$—Ph—O—R  (I)

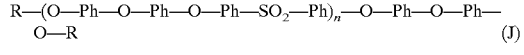

R—(O—Ph—O—Ph—O—Ph—SO$_2$—Ph)$_n$—O—Ph—O—Ph—O—R  (J)

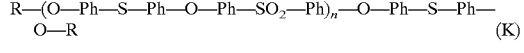

R—(O—Ph—S—Ph—O—Ph—SO$_2$—Ph)$_n$—O—Ph—S—Ph—O—R  (K)

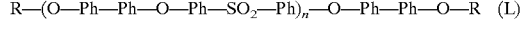

R—(O—Ph—Ph—O—Ph—SO$_2$—Ph)$_n$—O—Ph—Ph—O—R  (L)

wherein Ph denotes benzene ring, and R denotes the following chemical structure, n is a integer, the preferable range thereof being from 1 to 100 from the standpoint of moldability.

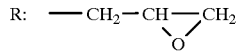

R: —CH$_2$—CH—CH$_2$
         \  /
          O

If the number of n exceeds over 100, the polyarylene polyether may become too high in melt viscosity to mold.

The molecular weight of polyarylene polyether constituting the (a) component of the resin component according to the second embodiment of this invention should preferably be 500 to 50,000, more preferably 800 to 30,000, most preferably 1,000 to 15,000. If the molecular weight of (a) component is less than 500, the resultant cured product may become brittle. On the other hand, if the molecular weight of (a) component exceeds over 50,000, the melt viscosity thereof may become too high to mold.

The polyarylene polyether chain moiety may or may not contain one or more substituent groups. For example, the polyarylene polyether chain moiety may contain halogen (for example, chlorine, bromine and fluorine), alkyl group containing 1 to 4 carbon atoms, alkoxyl group containing 1 to 4 carbon atoms, phenyl group and other inert substituents.

The polyarylene polyether constituting the (a) component can be synthesized in the same manner as explained in the synthesis of the (a) component of the first embodiment. Namely, after the preparation of polyarylene polyether having an alkaline metal salt as a terminal group, an equivalent or excessive amount (based on the terminal group of the alkaline metal salt) of epichlorohydrine is added to the aforementioned polyarylene polyether, and then the reaction mixture is allowed to react at a temperature ranging from room temperature to 120° C. for 1 to 20 hours with stirring to obtain the polyarylene polyether constituting the component (a).

In the resin composition according to the second embodiment of this invention, the content of the (a) component should preferably be about 5 to 90% by weight based on the entire resin composition. If the content is less than 5% by weight, the cured material resulting therefrom may become brittle. On the other hand, if the content is over 90% by weight, the thermal expansion coefficient of the cured material may become so large that a sufficient thermal shock resistance can not be obtained when the resin composition is applied to a resin-molded type semiconductor device. In view of obtaining a resin composition excellent in flame resistance, the employment of polyarylene polyether represented by the aforementioned formulas (G), (J), (K) and (L) is preferable.

The curing agent constituting the component (b) may be selected from those generally known to be useful as a curing agent for epoxy resin. Examples of such a curing agent are amines, acid anhydrides, phenols, etc. Specific examples of the curing agent are amines such as diethylene triamine, triethylene tetraamine, diethylamino propylamine, N-aminoethyl piperazine, benzyl dimethylamine, tris (dimethylaminomethyl) phenol, methaphenylene diamine, diaminodiphenylmethane, diaminodiphenyl sulfone, polyamide resin (amine value:200 to 350), dicyandiamide, boron trifluoride monoethylamine, methane diamine, xylene diamine, bisaminopropyl tetraoxaspiroundecane adduct and ethylmethylimidazole; an acid anhydride such as phthalic anhydride, maleic anhydride, dodecyl succinic anhydride, hexahydrophthalic anhydride, methyl nadic anhydride, pyromellitic anhydride, benzophenone tetracarboxylic anhydride, dichloro succinic anhydride and chlorendic anhydride; and phenol resin such as novolak phenol resin.

As for the novolak type phenol resin, any compound having two or more phenolic hydroxyl groups in its one molecule can be used. For example, phenol novolak resin, cresol novolak resin, t-butylphenol novolak resin, nonylphenol novolak resin, phenol aralkyl resin and dicyclopentadienephenol novolak resin can be used. Among them, phenol novolak resin is preferable in view of moldability and mechanical strength thereof.

Specific examples of phenol novolak resin are Shounol BRG-555 (Shouwa Kobunshi Co., softening point:68° C., melt viscosity:2.4 ps at 125° C.), Shounol BRG-556 (Shouwa Kobunshi Co., softening point:80° C., melt viscosity:1.8 ps at 150° C.), Shounol BRG-558 (Shouwa Kobunshi Co., softening point:97° C., melt viscosity:6.2 ps at 150° C.), Barcam TD-2131 (Dainihon Ink Co., softening point:80° C., melt viscosity:3.3 ps at 150° C.), Barcam TD-2093 (Dainihon Ink Co., softening point:100° C., melt viscosity:30 ps at 150° C.), SH-140A (Mitsubishi Yuka Co.), SH-150A (Mitsubishi Yuka Co.), and XPSF-4488 (Gunei Kagaku Co.).

In the resin composition according to the second embodiment of this invention, the employment as a curing agent of polyarylene polyether represented by the general formula of $Z_3$-(polyarylene polyether) chain-$Z_3'$ (wherein $Z_3$ and $Z_3'$ represent individually a monovalent organic group containing hydroxyl or carboxylic group) explained hereinafter and having a hydroxyl or carboxylic group on both terminal portions thereof is preferable in view of achieving excellent mechanical strength, heat resistance and flame resistance.

The mixing ratio of these curing agents should preferably be 5 to 100 parts by weight per 100 parts by weight of the (a) component. If the mixing ratio is less than 5 parts by weight, a sufficient heat resistance would not be obtained or the melt viscosity of the resin composition become too high, thus deteriorating the moldability thereof. On the other hand, if the content exceeds over 100 parts by weight, the water absorption of the cured material become too high, thus deteriorating the reliability of the molded product.

As for inorganic filler constituting (b) component of the resin composition, the same kinds of inorganic fillers as mentioned with reference to the first embodiment of this invention can be used.

The mixing ratio of the inorganic filler should preferably be 10 to 95% by weight, more preferably 40 to 90% by weight based on the weight of the entire resin composition. If the mixing ratio is less than 10% by weight, the thermal expansion coefficient of the cured material may become so large that a sufficient thermal shock resistance can not be obtained when the resin composition is applied to a resin-molded type semiconductor device. On the other hand, if the content is over 95% by weight, the flowability of the resin composition so deteriorated that the drifting of bonding wire or the dislocation of the bed during the molding step thereof may be caused to occur.

The resin composition according to the second embodiment of this invention may contain if required a curing catalyst such as a basic compound, an organic phosphine compound, an imidazole compound, a derivative these compounds, DBU (1,8-diazabicyclo(5,4,0) undecene-7) or a salt of DBU. These curing catalysts promote the curing reaction between the (a) component and a curing agent. Examples of the basic compound are tertiary amines such as benzylmetylamine, α-methylbenzyldimetylamine, dimethylaminomethyl phenol or trisdimethylaminomethyl phenol; and the salts or complex compounds thereof.

Examples of organic phosphine are trimethyl phosphine, triethyl phosphine, tributyl phosphine, triphenyl phosphine, tri(p-methylphenyl) phosphine, tri(nonylphenyl) phosphine, methyldiphenyl phosphine, dibutylphenyl phosphine, tricyclohexyl phosphine, 1,2-bis(diphenylphosphine) ethane, and bis(diphenylphosphine) methane.

Examples of imidazole compound are 2-methylimidazole, 2,4-dimethylimidazole, 2-ethyl-4-methylimidazole, 2-phenylimidazole, 2-phenyl-4-methylimidazole, and 2-heptadecylimidazole.

Examples of the phenol salt of DBU include SA-853 (Sanapro).

It is also possible to employ a latent curing catalyst such as HX3722 (Asahi Kasei Co.) or MY-25 (Ajinomoto Co.).

The content of the curing catalyst in the resin composition according to the second embodiment of this invention should preferably be 0.1 to 10 parts by weight per 100 parts by weight of the total amount of the (a) component, maleimide and phenol resin. If the content of curing catalyst is less than 0.1 part by weight, the curing of the resin composition may become insufficient so that the heat resistance of the resultant cured product, and hence the heat resistance of resin-molded semiconductor device may be deteriorated. On the other hand, if the content of the curing catalyst exceeds over 10 parts by weight, the heat resistance, moisture resistance and electric properties of the resultant cured product of the resin composition may be deteriorated. The preferable content of the curing catalyst is 0.5 to 5 parts by weight per 100 parts by weight of the total amount of the (a) component, maleimide and phenol resin.

The resin composition according to the third embodiment of the present invention is featured to comprise (a) a compound having two or more epoxy groups; (b) polyarylene polyether represented by the general formula of $Z_3$-(polyarylene polyether) chain-$Z_3'$ (wherein $Z_3$ and $Z_3'$ denote individually a monovalent organic group containing hydroxyl or carboxylic group); and (c) an inorganic filler.

As for the compound having epoxy group and constituting the (a) component, any kinds of epoxy compounds which are ordinarily known may be used as long as it contains in its molecule two or more epoxy groups. Examples of such compound are diglycidyl ether of bisphenol A, phenol novolak type epoxy resin, cresol novolak type epoxy resin, naphthol novolak type epoxy resin, novolak epoxy resin of bisphenol A, an epoxy resin derived from the epoxidation of a condensate of phenol or alkylphenol with hydroxybenzaldehyde, epoxidized tris(hydroxyphenyl) alkane, epoxidized tetra(hydroxyphenyl) alkane, tetraglycidyl ether of 2,2',4,4'-tetrahydroxybenzophenone, triglycidyl ether of p-aminophenol, polyallylglycidyl ether, 1,3, 5-trisglycidyl ether benzene, 2,2', 4,4'-tetraglycidoxy biphenyl, epoxidized 4,4'-bis(2,3-epoxypropoxy)-3,3',5,5'-tetramethyl biphenyl, and halogenized epoxy resins.

The (b) component formed of polyarylene polyether can be represented by the general formula of H—(O—Ar)n—OH or $Z_3$-(O—Ar)n—O$Z_3'$. Herein Ar denotes bivalent aromatic group. This Ar may be a repetition of different kinds of aromatic groups. Specific examples of the (b) component are polyarylene polyethers represented by the general formulas (M) to (R) shown below and the compounds of (M) to (R) whose hydroxyl group is substituted by phthalate, dodecyl succinate, hexahydrophthalate, methyl nadate, dichloro succinate.

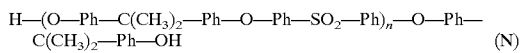

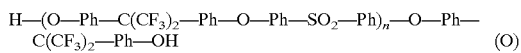

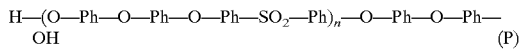

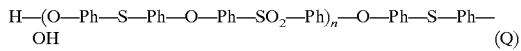

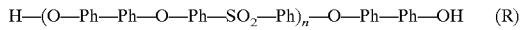

wherein Ph represents benzene ring, and n is a integer, the preferable range thereof being from 1 to 100 in view of moldability. If the number of n exceeds over 100, the polyarylene polyether may become too high in melt viscosity to mold. Among these compounds, compounds represented by the general formulas (M), (P), (Q) and (R) are more preferable in view of flame resistance thereof.

The polyarylene polyether having a hydroxyl group on both terminal portions thereof and constituting the (b) component of the resin composition according to the third embodiment of this invention functions, in combination with the epoxy resin, as a main resin component on one hand, and also as a curing agent on the other hand.

The molecular weight of polyarylene polyether constituting the (b) component should preferably be 500 to 50,000, more preferably 800 to 30,000, most preferably 1,000 to 15,000. If the molecular weight of this (b) component is less than 500, the resultant cured product may become brittle. On the other hand, if the molecular weight of this (b) component exceeds over 50,000, the melt viscosity thereof may become too high to mold.

The polyarylene polyether chain moiety may or may not contain one or more substituent groups. For example, the polyarylene polyether chain moiety may contain halogen (for example, chlorine, bromine and fluorine), alkyl group containing 1 to 4 carbon atoms, alkoxyl group containing 1 to 4 carbon atoms, phenyl group and other inert substituents.

The polyarylene polyether having a hydroxyl group on both terminal portions thereof and constituting the (b) component can be synthesized in the same manner as explained in the synthesis of the (a) component of the first embodiment. Namely, after the preparation of polyarylene polyether having an alkaline metal salt as a terminal group, an acid having a larger dissociation constant than that of phenol, such for example as carboxylic acid is added to the aforementioned polyarylene polyether to regenerate phenol, thus synthesizing the polyarylene polyether constituting the component (b).

On the other hand, in the case of the polyarylene polyether having a carboxyl group on both terminal portions thereof, it can be synthesized as follows. Namely, after the preparation of polyarylene polyether having an alkaline metal salt as a terminal group, an equivalent or excessive amount (based on the terminal group of the alkaline metal salt) of an acid anhydride is added to the aforementioned polyarylene polyether, and then the reaction mixture is allowed to react at a temperature ranging from room temperature to 120° C. for 1 to 20 hours with stirring. As for the acid anhydride to be useful in this case, an acid anhydride such as phthalic anhydride, dodecyl succinic anhydride, hexahydrophthalic anhydride, methyl nadic anhydride and dichloro succinic anhydride may be employed.

The mixing ratio of the (b) component should preferably be 5 to 500 parts by weight per 100 parts by weight of the (a) component. If the mixing ratio is less than 5 parts by weight, a sufficient heat resistance would not be obtained or the melt viscosity of the resin composition become too high, thus deteriorating the moldability thereof. On the other hand, if the content exceeds over 500 parts by weight, the water absorption of the cured material become too high, thus deteriorating the reliability of the molded product.

As for inorganic filler constituting (c) component of the resin composition, the same kinds of inorganic fillers as mentioned with reference to the first embodiment of this invention can be used. The mixing ratio of the inorganic filler should preferably be 10 to 95% by weight, more preferably 40 to 90% by weight based on the weight of the entire resin composition. If the mixing ratio is less than 10% by weight, the thermal expansion coefficient of the cured material may become so large that a sufficient thermal shock resistance can not be obtained when the resin composition is applied to a resin-molded type semiconductor device. On the other hand, if the content is over 95% by weight, the flowability of the resin composition so deteriorated that the drifting of bonding wire or the dislocation of the bed during the molding step thereof may be caused to occur.

As for the curing agent constituting the component (a), the curing agents to be employed in the second embodiment of this invention, e.g., amines, acid anhydrides, phenols may be also co-used together with the (b) component.

The resin composition according to the fourth embodiment of this present invention is featured to comprise (a) polyarylene polyether represented by the general formula of $Z_1$-(polyarylene polyether) chain-$Z_1'$ (wherein $Z_1$ and $Z_1'$ denote individually a monovalent organic group containing a cross-linkable unsaturated carbon-carbon linkage); (b) an inorganic filler; and (c) a compound containing at least one organic group having a cross-linkable unsaturated carbon-carbon linkage in its molecule, said compound having a molecular weight of 5,000 or less.

The (a) component formed of polyarylene polyether can be represented by the general formula of $Z_1\text{-}(O\text{—}Ar)_n\text{—}OZ_1'$. Herein Ar denotes bivalent aromatic group. Specific examples of the (a) component are polyarylene polyethers represented by the general formulas (A) to (H) described with reference to the first embodiment. The method of synthesizing the polyarylene polyether is the same as explained in the first embodiment.

As for the inorganic filler constituting the (b) component in the resin composition according to the fourth embodiment of this invention, the same kinds of inorganic fillers as explained in the first embodiment may be used. The mixing ratio of the inorganic filler should preferably be 10 to 95% by weight, more preferably 40 to 90% by weight based on the weight of the entire resin composition. If the mixing ratio is less than 10% by weight, the thermal expansion coefficient of the cured material may become so large that a sufficient thermal shock resistance can not be obtained when the resin composition is applied to a resin-molded type semiconductor device. On the other hand, if the content is over 95% by weight, the flowability of the resin composition so deteriorated that the drifting of bonding wire or the dislocation of the bed during the molding step thereof may be caused to occur.

The component (c) in the resin composition according to the fourth embodiment of this invention is a compound having a molecular weight of 5,000 or less and containing at least one organic group having a cross-linkable unsaturated carbon-carbon linkage in its molecule. Specific examples of it are diethylene glycol diallyl ether, N,N'-methylenebisacrylamide, diallyl chlorendate, diallyl hexahydrophthalate, triallyl trimellitate, 4-allyl-2,6-di-tert-butylphenol, diallylisophthalate, diallylphthalate, divinylbenzene, styrene, allylbenzene, divinylsulfone, allylbenzene carboxylate, 4-vinylbiphenyl, triallyl-1,3,5-benzene tricarboxylate, 2-ethylhexyl acrylate, 2-hydroxyethyl acrylate, 2-hydroxypropyl acrylate, tetrahydrofurfuryl acrylate, phenoxyethyl acrylate, nonylphenoxyethyl acrylate, tetrahydrofurfuryloxyethyl acrylate, tetrahydrofurfuryloxyhexanolide acrylate, ε-caprolactone adduct acrylate of 1,3-dioxane alcohol, 1,3-dioxorane acrylate, hexanediol acrylate, neopentylglycol diacrylate, diethylleneglycol diacrylate, tripropyleneglycol diacrylate, polyethyleneglycol diacrylate, hydroxypivalic neopentylglycol diacrylate, neopentylglycoladipate diacrylate, hydroxypivalic neopentylglycol ε-caprolactone adduct diacrylate, 2(2-hydroxy-1,1-dimethyl)-5-hydroxymethyl-5-ethyl-1,3-dioxane diacrylate, tricyclodecanedimethylol diacrylate, 1,6-hexanediol diglycidylether diacrylate, trimethylolpropane triacrylate, propionic dipentaerythritol triacrylate, propionic dipentaerythritol tetraacrylate, ditrimethylolpropane tetraacrylate, propionic dipentaerythritol pentaacrylate, dipentaerythritol hexaacrylate, dipentaerythritol hexaacrylate ε-caprolactone adduct, and maleimide resins exemplified as an additive for the resin composition of the first embodiment of this invention. Among these compounds for the (a) component, compounds having a molecular weight of 5,000 or less and a melting point of 200° C. or less are particularly preferable.

When the melt viscosity of the (a) component is too high in the resin composition according to the fourth embodiment of this invention, a compound which is similar in chemical structure to the (a) component and lower in molecular weight as compared with the (a) component may be added to the resin composition to improve the moldability of the resin composition without deteriorating the heat resistance of the cured material of the resin composition.

With regard to the (c) component, a compound having two or more cross-linkable unsaturated carbon-carbon linkages in its molecule is more preferable than a compound having only one cross-linkable unsaturated carbon-carbon linkage in its molecule in view of securing a high heat resistance of a cured material. Additionally, if the melting point of (c) component is too high, the melt viscosity of the resin composition may not be lowered thus making it difficult to improve the moldability of the resin composition. Therefore, the melting point of the (c) component should preferably be 200° C. or less.

The mixing ratio of the (c) component should preferably be 2 to 100 parts by weight per 100 parts by weight of the (a) component. If the mixing ratio is less than 2 parts by weight, the melt viscosity of the resin composition may become too high thereby deteriorating the moldability of the resin composition. On the other hand, if the mixing ratio exceeds over 100 parts by weight, the cured material of the resin composition may become brittle.

It is also possible in the resin composition of this fourth embodiment to employ a curing catalyst of the same kinds as employed in the first embodiment.

The resin composition according to the fifth embodiment of this invention is featured to comprise:

(a) polyarylene polyether having a siloxane bond on the backbone chain thereof and a thermally curable organic group at the terminal thereof; and (b) an inorganic filler.

Since a siloxane bond is introduced in the backbone chain, the melt viscosity of the resultant polymer will be lowered, so that it is possible to obtain a resin composition which is excellent in moldability. Moreover, since the siloxane bond is flexible enough to relax a stress, the heat shock resistance of the resin composition can be improved. The purpose of the introduction of siloxane bond according to the fifth embodiment of this invention is to improve the moldability and heat shock resistance of the resin composition while retaining the inherent properties, i.e. low water absorption and high heat resistance properties of the polyarylene polyether.

As examples of the (a) component, the polyarylene polyethers represented by the following general formulas (9) to (11) can be employed.

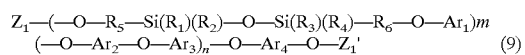

(9)

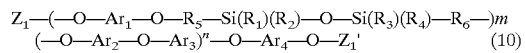

(10)

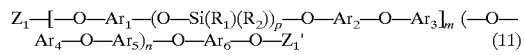

(11)

wherein $Z_1$ and $Z_1'$ respectively denotes a thermally cross-linkable monovalent organic group; $Ar_1$ to $Ar_6$ may be the same or different and are individually a bivalent aromatic group or $\text{—}R_5\text{—}Si(R_1)(R_2)\text{—}O\text{—}Si(R_3)(R_4)\text{—}R_6\text{—}$; $R_1$ to $R_4$ respectively denotes a monovalent organic group; $R_5$ and $R_6$ respectively denotes a bivalent organic group; m and p respectively denotes an integer; and n is 0 or an integer.

Preferable examples of the cross-linkable monovalent organic group $Z_1$ and $Z_1'$ are alkenyl group, alkynyl group and cycloalkynyl group. Specific examples of $Z_1$ and $Z_2$ are allyl, vinyl, propenyl, propargyl, ethynyl, acryl, methacryl, etc. These $Z_1$ and $Z_1'$ may be a monovalent organic group having epoxy group such as glycidyl ether.

The following formulas represent specific examples of $Ar_1$ to $Ar_6$, which are individually a bivalent aromatic group or a bivalent siloxane structure of —$R_5$—Si($R_1$)($R_2$)—O—Si($R_3$)($R_4$)—$R_6$—.

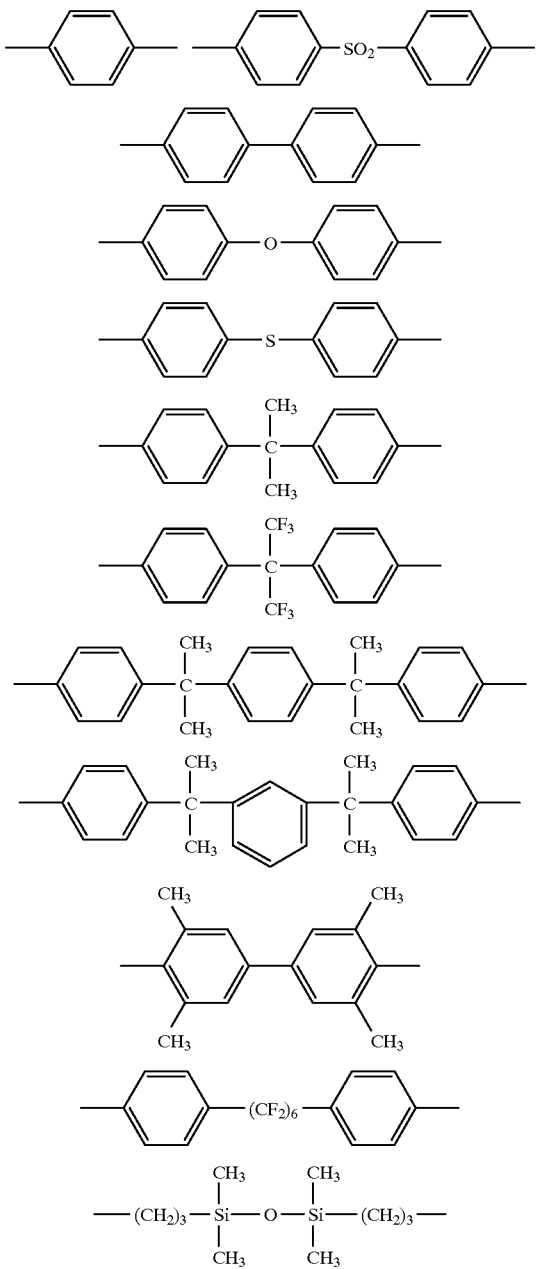

Specific examples of $R_1$ to $R_4$ are alkyl group having 1 to 10 carbon atoms, phenyl group and naphthyl group, and specific examples of $R_5$ and $R_6$ are alkylene group having 1 to 6 carbon atoms, phenylene group and naphthylene group.

The total of the integers m and n, (m+n) should preferable be 1 to 50 in view of moldability.

The molecular weight of (a) component of the resin composition, i.e. polyarylene polyether should preferably be 500 to 50,000, more preferably 800 to 30,000, most preferably 1,000 to 15,000.

The polyarylene polyether represented by the general formula (9) can be synthesized according to a method described for example in Japanese Patent Publication H1-42289. Namely, first of all, a bisphenol compound and a dialcohol compound having a siloxane bond are reacted with alkaline metal hydroxide to obtain alkaline metal salts of bisphenol and dialcohol compounds.

In this case, there is no restriction as to the bisphenol compound to be employed. However, among them, hydroquinone, bisphenol A, 4,4'-dihydroxyphenyl ether, 4,4'-dihydroxyphenyl methane, 4,4'-dihydroxyphenyl sulfide, 2,2-bis(4-hydroxydiphenyl) hexafluoropropane and 4,4'-dihydroxyphenyl sulfone are preferable. As for the dialcohol compound having a siloxane bond, 1,3-bis(3-hydroxypropyl) 1,1,3,3-tetramethyl disiloxane may be employed.

More specifically, these bisphenol compound and dialcohol compound are dissolved into a mixed solvent consisting of a solvent such as N-methylpyrrolidone, N,N-dimethylacetoamide or dimethylsulfoxide and a solvent which is capable of forming an azeotropic mixture with water such as toluene, xylene, benzene and chlorobenzene to obtain a mixed solution to which an alkaline metal hydroxide such as sodium hydroxide or potassium hydroxide is added, and then heated for about 20 to 240 minutes at a temperature of about 110° C. to 150° C., while removing water together with an azeotropic agent, to obtain alkaline metal salts of bisphenol and dialcohol compounds. It is also possible to obtain the alkaline metal salts of bisphenol and dialcohol compounds by reacting these bisphenol and dialcohol compounds with an alkaline metal hydride such as sodium hydride or with metallic sodium instead of using an alkali metal hydroxide.

Then, to the reaction solution of the alkaline metal salts is added a dihalogen compound. In this case, a stoichiometrically excessive amount of the alkaline metal salts is reacted with a dihalogen compound to obtain polyarylene polyether having an alkaline metal salt as a terminal group. This reaction can be performed by heating the reaction mixture at a temperature of about 150° C. to 170° C., while removing water in the reaction mixture together with an azeotropic agent, for about 1 to 30 hours to obtain polyarylene polyether having an alkaline metal salt at its terminal and a siloxane bond on the backbone chain thereof. In this case, the total of the alkaline metal salt of bisphenol compound and the alkaline metal salt of dialcohol compound having a siloxane bond should preferably be about 1.02 to 2.00 moles per 1 mole of the dihalogen compound. As for the dihalogen compound, an aromatic compound having a bivalent activated halogen-substituted group may be used. Typical examples of such an aromatic compound are 4,4'-dichlorodiphenyl sulfone, 4,4'-difluorodiphenyl sulfone, 4,4'-dichlorodiphenyl disulfide, 4,4'-dichlorobenzophenone and 4,4'-dibromodiphenyl ether.

Finally, the hydroxyl group attached to the terminal of the alkaline metal salt molecule is then reacted with a halogen compound having a cross-linkable group thereby to introduce the cross-linkable group into the terminal site of the polymer. The halogen compound having a cross-linkable group can be reacted with the polyarylene polyether having an alkali metal terminal group at a molar ratio of 2:1. However, the halogen compound should preferably be added in a stoichiometrically excessive amount, i.e. by an excess of about 2 to 50 mole %, to the polyarylene polyether. This reaction can be performed at a temperature ranging from room temperature to about 120° C., completing the reaction in about 1 to 20 hours if a preferable temperature is selected.

The halogen compound having a cross-linkable group may be selected from aryl chloride, aryl bromide, propargyl bromide, vinylbenzyl chloride, acrylic chloride, methacrylic chloride, aryl chloroformate, 2-chloroethyl vinylether and epichlorohydrin.

Instead of using a halogen compound having a cross-linkable group, the introduction of a cross-linkable group may be performed by allowing the terminal hydroxyl group of the alkali metal salt to be reacted with an acid anhydride having an unsaturated carbon-carbon linkage such as maleic anhydride, citraconic anhydride, tetrahydrophthalic anhydride and 3,6-endomethylene tetrahydrophthalic anhydride.

Finally, the reaction solution was filtered to remove salts therefrom. The filtrate was then poured into water, ethanol, methanol or hexane, thus precipitating a polymer, which was then collected through filtration and dried to obtain the aimed polymer.

The compound represented by the general formula (10) of the component (a) of the fifth embodiment can be synthesized according to the same method as employed in the synthesis of the compound represented by the general formula (10). Namely, first of all, a bisphenol compound is reacted with alkaline metal hydroxide to obtain an alkaline metal salt of bisphenol compound. Then, to the reaction solution of the alkaline metal salt are added an aromatic compound (a dihalogen compound) having a bivalent activated halogen-substituted group and a dihalogen compound having a siloxane bond. In this case, a stoichiometrically excessive amount of the alkaline metal salt is reacted with a dihalogen compound to obtain polyarylene polyether having an alkaline metal salt as a terminal group. As for the bisphenol compound and dihalogen compound, the same kinds of compounds as employed in the synthesis of the compound represented by the general formula (9) can be employed. The reaction conditions such as solvent, heating time and temperature may also be the same as employed in the synthesis of the compound represented by the general formula (9). As for the dihalogen compound having a siloxane bond, 1,3-bis(3-chloropropyl) 1,1,3,3-tetramethyl disiloxane may be employed.

In this case, the amount of the alkaline metal salt of bisphenol compound to be employed for the reaction should preferably be about 1.02 to 2.00 moles per 1 mole of the total of the dihalogen compound and the dihalogen compound having a siloxane bond.

Then, the hydroxyl group attached to the terminal of the alkaline metal salt molecule is reacted with a halogen compound having a cross-linkable group and with an acid anhydride having a carbon-carbon unsaturated linkage, thereby to introduce the cross-linkable group into the polymer to obtain the compound represented by the general formula (2). The reaction conditions for introducing a cross-linkable group such as heating time and temperature may also be the same as employed in the synthesis of the compound represented by the general formula (9).

In the synthesis of the compound represented by the general formula (11), a bisphenol compound is reacted with an alkali metal hydroxide to obtain an alkali metal salt of the bisphenol compound. After sufficiently removing water through azeotropy with toluene, the alkali metal salt of bisphenol compound is allowed to react with stoicheometrically insufficient amount (in relative to the alkali metal salt) of dichlorosilane to obtain a metal salt of bisphenol compound having a siloxane bond. Examples of dichlorosilane useful in this case are alkyl dichlorosilane or phenyl dichlorosilane such as dimethyl dichlorosilane, methylethyl dichlorosilane, methylpropyl dichlorosilane, diethyl dichlorosilane, ethoxymethyl dichlorosilane, diethoxy dichlorosilane, butylmethyl dichlorosilane, methylpentyl dichlorosilane, methylphenyl dichlorosilane, cyclohexylmethyl dichlorosilane, n-hexylmethyl dichlorosilane, heptylmethyl dichlorosilane, methyloctyl dichlorosilane, diphenyl dichlorosilane, dihexyl dichlorosilane, dodecylmethyl dichlorosilane, docosylmethyl dichlorosilane, 1,2-bis (dimethyldichlorosilyl) ethane, bis(dimethyldichlorosilyl) methane, 1,4-bis(dimethylchlorosilyl) benzene, 1,1,3,3,5,5-hexamethyl-1,5-dichlorotrisiloxane, 1,7-dichlorooctamethyl tetrasiloxane, diallyl dichlorosilane and phenylvinyl dichlorosilane. It is also possible to use a dichlorosilane having a carbon-carbon unsaturated group such as allylphenyl dichlorosilane or 2-(4-chlorohexenylethyl) methyl dichlorosilane. The reaction can be performed at a temperature ranging from room temperature to about 120° C., accomplishing the reaction within 1 to 20 hours in general if the reaction temperature is suitably selected.

Then, to the reaction solution of the alkaline metal salts is added an aromatic compound (a dihalogen compound) having a bivalent activated halogen-substituted group. In this case, a stoichiometrically excessive amount of the alkaline metal salt of the bisphenol compound having a siloxane bond is reacted with a dihalogen compound to obtain polyarylene polyether having an alkaline metal salt as a terminal group. As for the bisphenol compound and dihalogen compound, the same kinds of compounds as employed in the synthesis of the compound represented by the general formula (1) can be employed. The reaction conditions such as solvent, heating time and temperature may also be the same as employed in the synthesis of the compound represented by the general formula (1).

In this case, the alkaline metal salt of bisphenol compound should preferably be reacted with dihalogen compound at a molar ratio of 1.02 to 2.00 moles per 1 mole of the dihalogen compound. If the amount of the alkaline metal salt is less than 1.02 moles, the cross-linking group may not be introduced into the terminals of the polymer. On the other hand, if the amount of the alkaline metal salt exceeds over 2.00 moles, the resultant polymer may become brittle.

Then, the hydroxyl group attached to the terminal of the alkaline metal salt molecule is reacted with a halogen compound having a cross-linkable group and an acid anhydride having a carbon-carbon unsaturated linkage, thereby to introduce the cross-linkable group into the polymer to obtain the compound represented by the general formula (11). The reaction conditions for introducing a cross-linkable group such as heating time and temperature may also be the same as employed in the synthesis of the compound represented by the general formula (9).

In the synthesis of the polymer represented by the general formula (9), when the number of moles of dialcohol having a siloxane bond that will be employed in the reaction for synthesis is defined as "a", and likewise the number of moles of bisphenol is defined as "b", the ratio of b/(a+b) should preferably be in the range of 0 to 0.99, more preferably 0.50 to 0.95. If the ratio exceeds over 0.99, the heat shock resistance of the resultant resin would be lowered.

In the synthesis of the polymer represented by the general formula (10), when the number of moles of dihalogen compound having a siloxane bond that will be employed in the reaction for synthesis is defined as "a", and likewise the number of moles of the aromatic compound having a bivalent activated halogen-substituted group is defined as "b", the ratio of b/(a+b) should preferably be in the range of 0 to 0.99, more preferably 0.50 to 0.95. If the ratio exceeds over 0.99, the heat shock resistance of the resultant resin would be lowered.

In the synthesis of the polymer represented by the general formula (11), when the number of moles of dichlorosilane that will be employed in the reaction for synthesis is defined as "a", and likewise the number of moles of bisphenol is defined as "b", the ratio of b/(a+b) should preferably be in the range of 0.50 to 0.95. If the ratio is less than 0.50, a reaction mixture may be gelated. On the other hand, if the ratio exceeds over 0.99, the heat shock resistance of the resultant resin would be lowered.

It is possible to obtain a polymer having an optimum melt viscosity and strength depending on the end-use of the resin composition by suitably selecting these ratios.

Among various reactions mentioned above, a reaction between an alkali metal salt of bisphenol or an alkali metal salt of dialcohol having a siloxane bond and a dihalogen compound, as well as a reaction between polyarylene polyether having an alkali metal terminal group and a halogen compound having a cross-linkable group are respectively a desalting reaction, so that alkali metal ions or halogen ions may be intermingled in a product as impurities. At the same time, there is a possibility that unreacted alkyl halide or unreacted aryl halide may be left remain in the product of these reaction. Among them, the alkyl chloride is more likely to be hydrolyzed, thus generating chlorine ions, which may become a cause of the corrosion of aluminum wirings or damage the anti-moisture reliability of a semiconductor device.

The concentration of alkaline metals contained as an impurity in the synthesized polyarylene polyether should preferably be limited to 50 ppm or less, more preferably 20 ppm or less, most preferably 5 ppm or less. On the other hand, the concentration of halogen compounds contained as an impurity in the synthesized polyarylene polyether should preferably be limited to 500 ppm or less, more preferably 300 ppm or less, most preferably 100 ppm or less.

If more than 50 ppm of alkali metal or 500 ppm of halogen compound is found to be contained in the polymer, these impurities should preferably be reduced by the methods as explained below.

Namely, such a polymer is first dissolved in a water-soluble polar solvent such as N-methylpyrrolidone, N,N-dimethylacetoamide, N,N-dimethyl formamide or tetrahydrofuran, and then the resultant solution is dripped into a large quantity of water or a dilute aqueous solution of organic acid such as oxalic acid or acetic acid to precipitate a polymer, which was subsequently collected through filtration. As an alternative method for removing impurities, the polymer is allowed to dissolve in an organic solvent such as dichloromethane, which is immiscible with water, and then mixed with water or a dilute aqueous solution of organic acid. The resultant mixture is shaken and left to stand to allow the organic phase to be separated form the aqueous phase, the organic phase being subsequently collected. These operations may be repeated until the concentration of alkali metal salt or halogen impurities are lowered down to an allowable level.

The following formulas represent specific examples of the (a) component of the fifth embodiment.

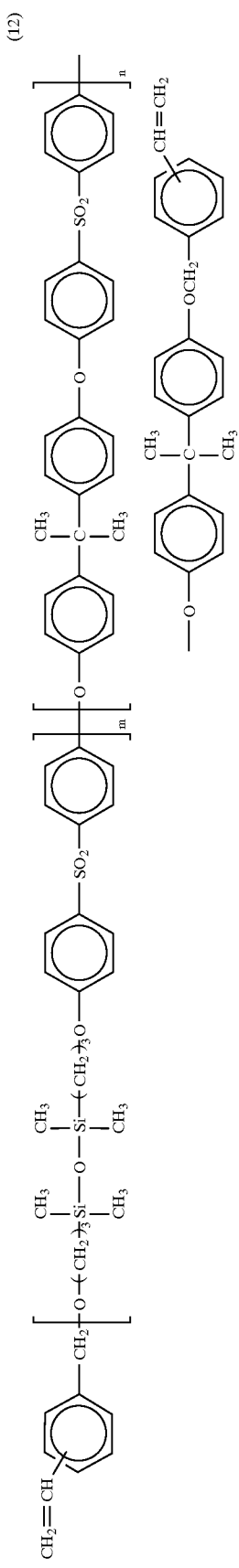
(12)
$m/(m+n) = 0.10$, Mw 2500
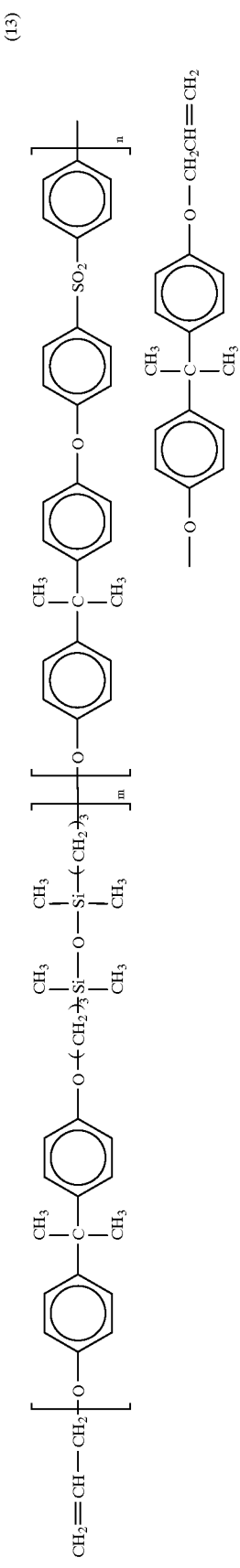
(13)
$m/(m+n) = 0.20$, Mw 3000
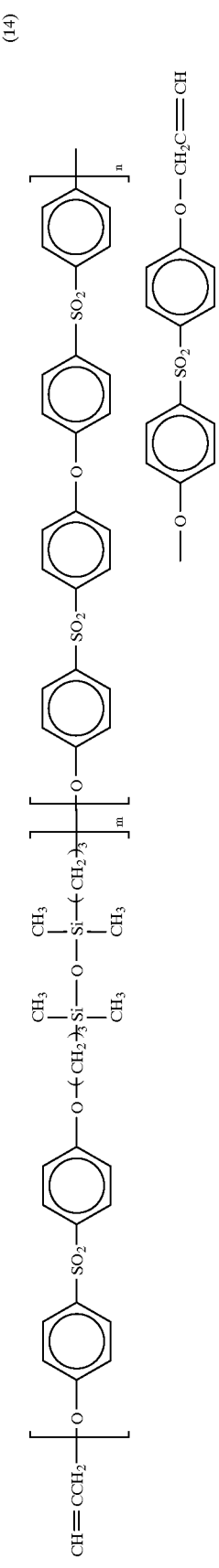
(14)
$m/(m+n) = 0.25$, Mw 5000

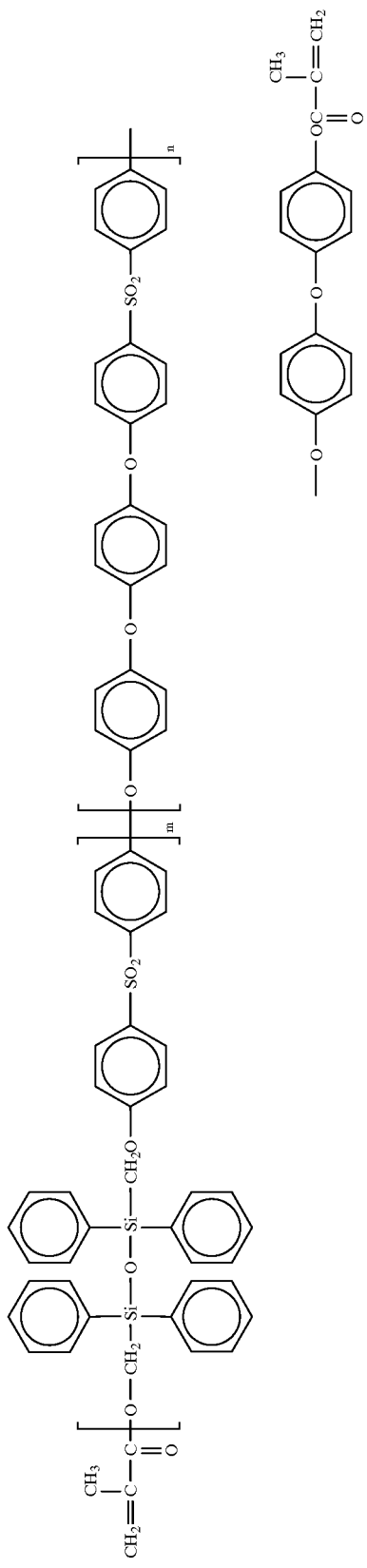
(15)
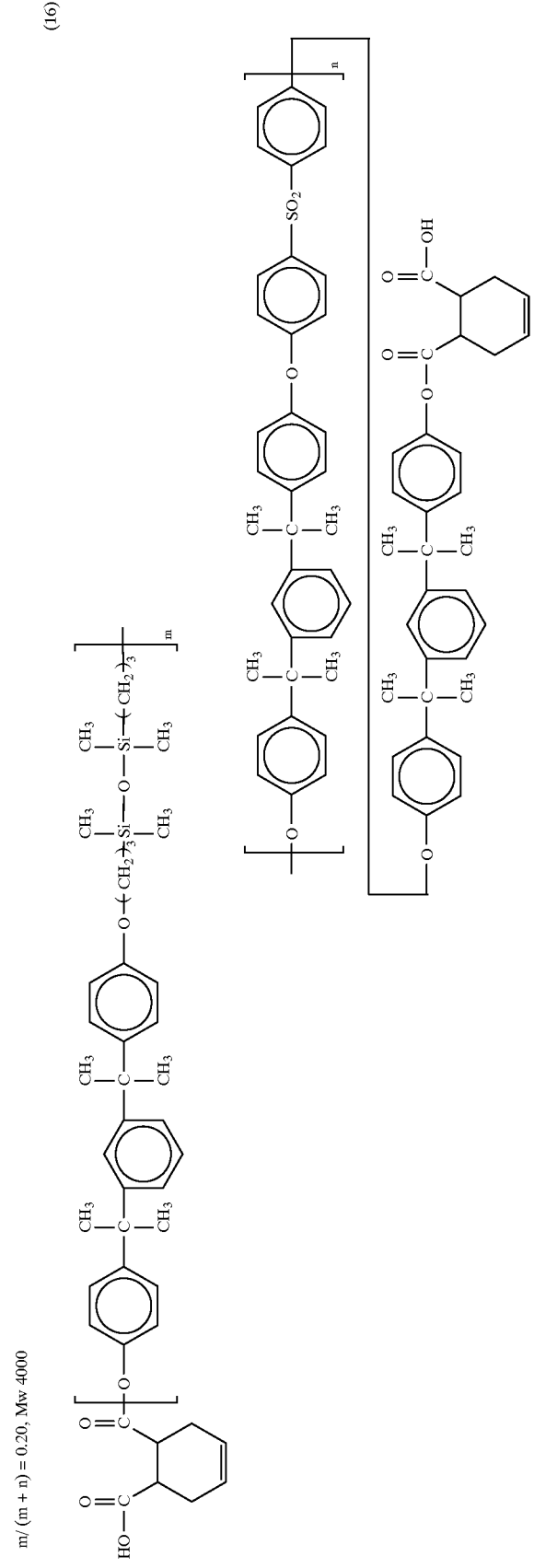
(16)

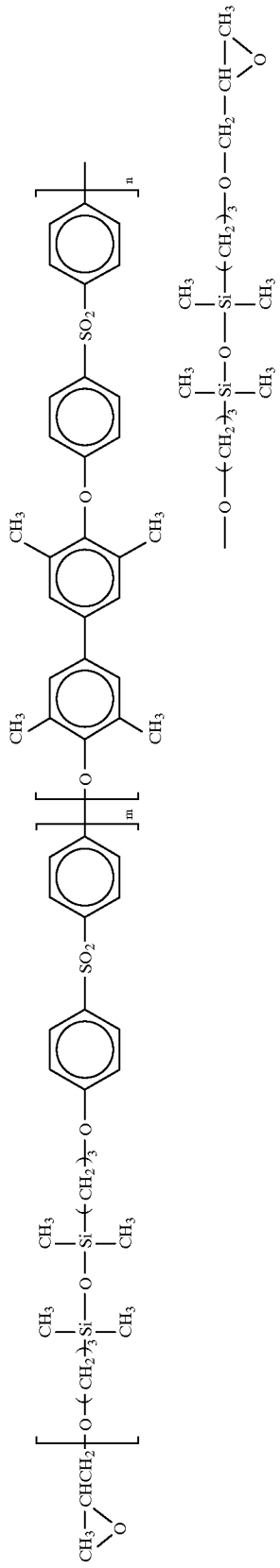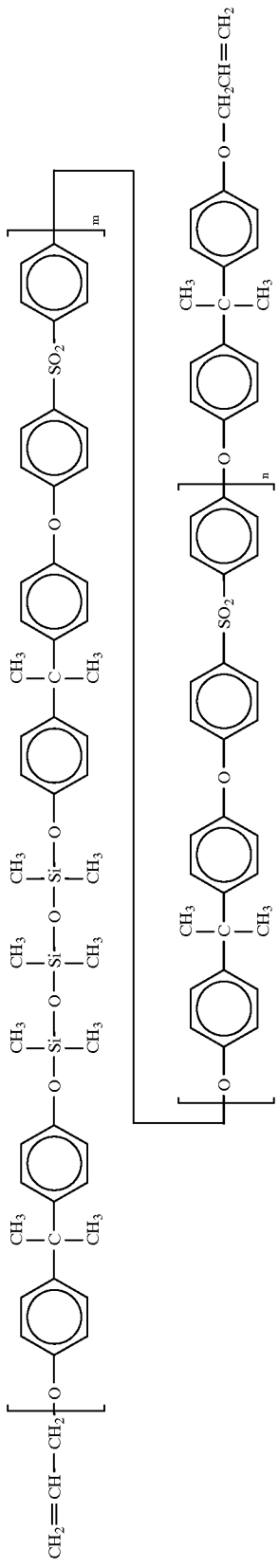

In the resin composition according to the fifth embodiment of this invention, the content of (a) component should preferably be about 5 to 60 parts by weight of the entire resin composition. If the content is less than 5 parts by weight, the cured resin composition becomes brittle. On the other hand, if the content is over 60 parts by weight, the thermal expansion coefficient of the cured material may become so large that a sufficient thermal shock resistance can not be obtained when the resin composition is applied to a resin-molded type semiconductor device.

As for inorganic filler constituting (b) component of resin composition, the same kinds of inorganic fillers as mentioned with reference to the first embodiment of this invention can be used.

The mixing ratio of the inorganic filler should preferably be 40 to 95% by weight based on the weight of the entire resin composition. If the mixing ratio is less than 40% by weight, the thermal expansion coefficient of the cured material may become so large that a sufficient thermal shock resistance can not be obtained when the resin composition is applied to a resin-molded type semiconductor device. On the other hand, if the content is over 95% by weight, the flowability of the resin composition so deteriorated that the drifting of bonding wire or the dislocation of the bed during the molding step thereof may be caused to occur.

When the resin composition according to the fifth embodiment of this invention is further added with a maleimide resin, heat resistance and adhesion to a semiconductor chip of the resin composition can further promoted. As for maleimide resin, the same kinds of maleimide resin as mentioned with reference to the first embodiment of this invention can be used.

Further, in order to lower melting viscosity and improving moldability of the resin composition according to the fifth embodiment of this invention, (c) component of the fourth embodiment can be added as a reactive diluent.

The content of the maleimide resin and reactive diluent should preferably be about 50 parts by weight or less based on 100 parts by weight of (a) component. If the content is more than 50 parts by weight, the cured resin composition becomes brittle.

When the terminal group of (a) component is epoxy group, it is necessary to use a curing agent. The curing agent may be selected from those generally known to be useful as a curing agent for epoxy resin. The content of the curing agent should preferably be 1 to 50 parts by weight per 100 parts by weight of (a) component. If the content is less than 1 parts by weight, curing is insufficient and a sufficient heat resistance would not be obtained. On the other hand, if the content is over 50 parts by weight, the water absorption of the cured material become too high, thus deteriorating the reliability of the molded product.

When the terminal crosslinkable group of (a) component according to the fifth embodiment of this invention has an unsaturated carbon-carbon bond, a curing catalyst can be used to promote the curing reaction between (a) component and the curing agent. As for the curing catalyst, the same kinds of the curing catalyst as mentioned with reference to the first and second embodiments of this invention can be used.

Those curing catalysts include a peroxide, azo compound, basic compound, an organic phosphine compound, an imidazole compound, the derivative of these compounds, DBU or a salt of DBU. It is also possible to employ a latent curing catalyst as mentioned above.

The content of the curing catalyst in the resin composition according to the fifth embodiment of this invention should preferably be 0.1 to 10 parts by weight per 100 parts by weight of the total amount of the (a) component and the curing agent. If the content of curing catalyst is less than 0.1 part by weight, the curing of the resin composition may become insufficient so that the heat resistance of the resultant cured product, and hence the heat resistance of resin-molded semiconductor device may be deteriorated. On the other hand, if the content of the curing catalyst exceeds over 10 parts by weight, the moisture resistance and insulating property of the resultant cured product of the resin composition may be deteriorated.

An adhesion-promoting agent may be used in any of the resin compositions according to the first, second, third, fourth and fifth embodiments of this invention for the purpose of improving the adhesion of the resin compositions to semiconductor elements. Examples of such an adhesion-promoting agent are a thermosetting resin such as epoxy resin, amino resin, polyurethane resin and unsaturated polyester; an isocyanate compound, rubber, silane compound and a metallic chelate compound.

Out of these compounds, the metallic chelate compound is effective in improving not only the adhesion with a semiconductor element, but also the water resistance of the cured resin. Examples of such a metallic chelate compound are Zr chelate, Ti chelate and Al chelate. Specific examples of Zr chelate are tetrakisacetylacetonato zirconium, monobutoxytrisacetylacetonato zirconium, dibutoxybisacetylacetonato zirconium, tributoxyacetylacetate zirconium, tetrakisethylacetylacetonato zirconium, butoxytrisethylacetylacetate zirconium, tributoxymonoethylacetylacetate zirconium, tetrakisethyl lactate zirconium, dibutoxybisethyl lactate zirconium, bisacetylacetonato bisethylacetylacetonato zirconium, monoacetylacetonato trisethylacetylacetonato zirconium, monoacetylacetonato bisethylacetylacetonato zirconium, and bisacetylacetonatobisethyl lactonate zirconium. As for the Ti chelate and Al chelate, a compound having a ligand such as β-diketone, hydroxycarboxylic acid, ketoester, ketoalcohol and glycol may be employed.

As for the epoxy resin to be used as an adhesion-promoting agent, any kinds of epoxy resin having an epoxy group in its molecule can be used. For example, phenol novolak epoxy resin, cresol novolak epoxy resin, naphthol novolak type epoxy resin, novolak epoxy resin of bisphenol A, epoxidized tris(hydroxyphenyl) alkane derived from the epoxidation of a condensate of phenol or alkylphenol with hydroxybenzaldehyde, epoxidized tetra(hydroxyphenyl) alkane, 2,2',4,4'-tetraglycidoxybenzophenone, triglycidyl ether of p-aminophenol, polyallylglycidyl ether, 1,3,4-triglycidyl ether benzene, 2,2', 4,4'-tetraglycidoxy biphenyl, epoxidized 4,4'-bis(2,3-epoxypropoxy)-3,3',5,5'-tetramethyl biphenyl, and halogenized epoxy resins.

When a thermosetting resin or rubber is employed as an adhesion-promoting agent in the resin composition of this invention, the mixing ratio of the thermosetting resin or rubber should preferably be 0.5 to 20% by weight based on the resin composition. If the mixing ratio is less than 0.5% by weight, a sufficient effect would not be obtained. On the other hand, if the mixing ratio exceeds over 20% by weight, the water absorption of the cured material become too high or the heat resistance of the molded product would be deteriorated. When a metallic chelate is employed as an adhesion-promoting agent in the resin composition of this invention, the mixing ratio of the metallic chelate should preferably be 0.01 to 5% by weight based on the resin composition. If the mixing ratio is less than 0.01% by weight, a sufficient effect would not be obtained. On the other hand, if the mixing ratio exceeds over 5% by weight, the interconnecting wirings of semiconductor elements may be eroded due to the ionic impurities, or the electric insulation of the molded product would be deteriorated when the resin composition is applied to a resin-molded semiconductor device.

Additionally, other additives such as a flame retardant such as antimony trioxide, a phosphorus compound and a halogen-containing compound; a releasing agent such as natural wax, synthetic wax, linear fatty acid or metal salts thereof, acid amides, esters and paraffins; a pigment such as carbon black and titanium dioxide; and a surface-treating agent such as silane coupling agent may be added to the resin composition of this invention. Furthermore, a stress-relieving agent such as silicone rubber, silicone oil, various kinds of plastic powder, engineering plastic powder, ABS resin powder and MBS resin powder may be incorporated into the resin compound of this invention.

The content of alkaline metals in the aforementioned polyarylene polyether should be controlled to 50 ppm or less, and likewise the content of halogen should also be controlled to 500 ppm or less in the preparation of the resin composition of this invention. Namely, the reactions for synthesizing the (a) component in the first, second and fourth embodiments as well as the reaction for synthesizing the (b) component in the third embodiment of this invention all involve a desalting reaction, so that there is much possibility of entrapping alkaline metal ions or halogen ions as impurities in the resin composition. It is also conceivable that non-reacted alkyl halide or aryl halide may be left in the resin composition, or halide compounds may be generated in a side reaction.

For example, alkyl chloride such as epichlorohydrine more likely to be hydrolyzed generating chlorine ions, thus eroding aluminum interconnecting wirings or deteriorating the reliability on the moisture resistance of a semiconductor device. Thus, it is known that when a resin composition containing alkaline metals or halogen impurities is used for sealing a semiconductor element, it will give rise to the disconnection of interconnecting wirings due to the erosion of aluminum wiring or the deterioration of moisture resistance ("Epoxy Resin Handbook", M. Sinpo, Nikkan Kogyo Newspaper, pp446–469, 1987). Therefore, the removal of these impurities, i.e. alkaline metals or halogens are required.

These impurities can be effectively removed by a process wherein a resin composition containing these impurities is dissolved in a water-soluble polar solvent such as N-methylpyrolidone, N,N-dimethylacetoamide or THF thereby forming a resin solution which is then dripped into a large quantity of water or into a diluted aqueous solution of an organic acid such as oxalic acid, and the resultant precipitated polymer is collected through filtration. It is also possible to remove these impurities by a process wherein a resin composition containing these impurities is dissolved in an organic solvent which is incapable of being intermixed with water such as a chlorine-based organic solvent, then water or a diluted aqueous solution of an organic acid is added to the solution of the resin, the resultant mixed solution is left to stand after being shaken, thus separating the mixed solution into an organic solvent phase and an aqueous phase, and the organic solvent phase is collected thereby removing these impurities. These processes can be repeated until the concentrations of alkaline metals or halogen impurities are reduced to the predetermined acceptable concentrations. Namely, the concentration of alkaline metals contained as an impurity in the synthesized resin should preferably be limited to 50 ppm or less, more preferably 20 ppm or less, most preferably 5 ppm or less. On the other hand, the concentration of halogen compounds contained as an impurity in the synthesized resin should preferably be limited to 500 ppm or less, more preferably 300 ppm or less, most preferably 100 ppm or less.

The amount of alkaline metals such as sodium and potassium in polyarylene polyether may be determined, after decomposing a resin sample with nitric acid or perchloric acid, by means of atomic absorption method. On the other hand, the amount of halogens such as chlorine or bromine can be determined by ashing a resin sample together with sodium hydroxide, removing sodium using an ion exchange resin, and determining the quantity of halogens by making use of ion chromatography. As an alternative method, a resin sample is immersed in a hot water to extract alkaline metals or halogens into the hot water, the quantities of which are then determined by means of atomic absorption method or ion chromatography.

The resin composition of this invention can be prepared as follows. Namely, the whole components are thoroughly intermixed by means for example of Henschel mixer, and then subjected to a melt-mixing treatment using a hot roll or a biaxial extruder, the resultant melt being subsequently cooled to room temperature and pulverized using a hammer mill.

As for the method of sealing a semiconductor element with a resin composition of this invention, a low pressure transfer molding can be employed. However, the sealing method is not restricted to the transfer molding, but any other sealing methods such as a compression molding, an injection molding or a cast molding can be employed for sealing a semiconductor chip. The thermal curing after the sealing should preferably be performed at a temperature of not less than 150° C. There are no limitations regarding the kinds and size of the semiconductor element to be sealed with the cured material of the resin composition.

FIGURE illustrates a longitudinal sectional view showing one example of the resin-molded type semiconductor device of this invention. Referring to FIGURE, to manufacture the resin-molded type semiconductor device of this invention, a semiconductor chip 1 is mounted on the island 2 of a lead frame 4, the bonding pad 3 on the surface of the semiconductor chip 1 is electrically connected with the outer leads of the lead frame 4 by way of bonding wire 5. and then the semiconductor chip 1 is covered and sealed with a resin layer 6 consisting of the cured material of the resin composition of this invention.

Polyarylene polyether is employed in any of the first, second, third, fourth, and fifth embodiments of this invention, since this polyarylene polyether is very low in water absorption. Therefore, the semiconductor device whose semiconductor elements are sealed with a resin composition containing polyarylene polyether is free from the generation of cracks (that might be brought about by the evaporation of water, if water is contained in the sealing resin) in the sealing resin layer even if the semiconductor device is exposed to a high temperature during the mounting step of the semiconductor device. Accordingly, the moisture resistance reliability of a semiconductor device can be extremely enhanced.

Furthermore, since polyarylene polyether is excellent in heat resistance, the heat resistance and thermal shock resistance of a semiconductor device sealed with the cured material of the resin composition containing this polyarylene polyether are also excellent. Moreover, since the resin composition according to this invention is excellent in moldability, a semiconductor chip can be easily sealed by any desired molding method.

In particular, when a semiconductor chip is sealed with the cured material of a resin composition comprising polyarylene polyether containing a limited amount of impurities, i.e., not more than 50 ppm of alkaline metals, and not more than 500 ppm of halogens, the corrosion of aluminum interconnecting wirings of semiconductor elements can be effectively prevented. Therefore, the moisture resistance reliability of the semiconductor device can be further improved.

The resin composition of this invention is applicable not only to the sealing of a semiconductor element, but also to various end-use, for example for the manufacture of a printed wiring board.

This invention will be further explained with reference to the following examples.

EXAMPLES 1 TO 8

The kinds of polyarylene polyether employed in these Examples are shown below.

(S) 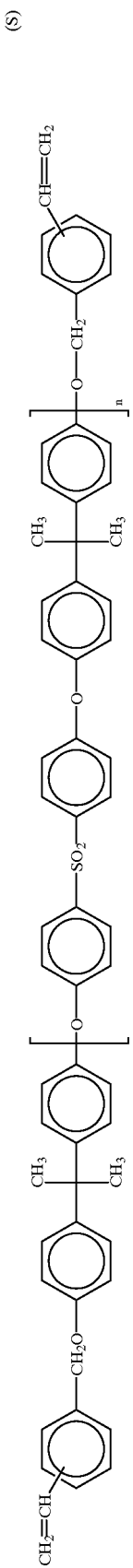
(T) 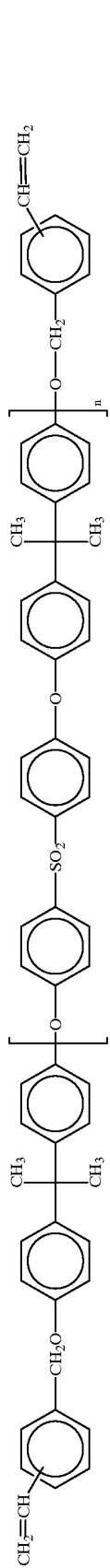
(U) 
(V) 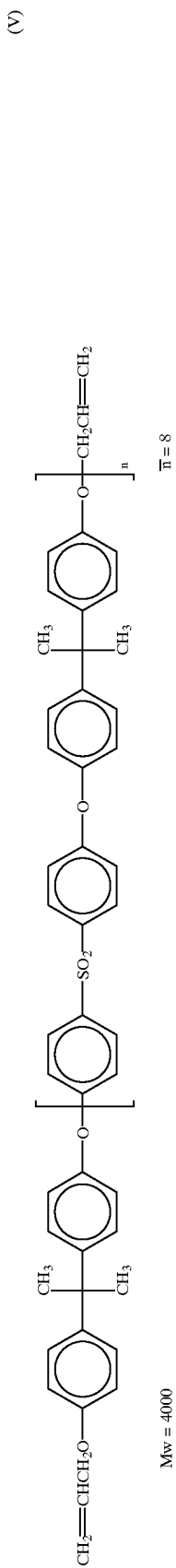

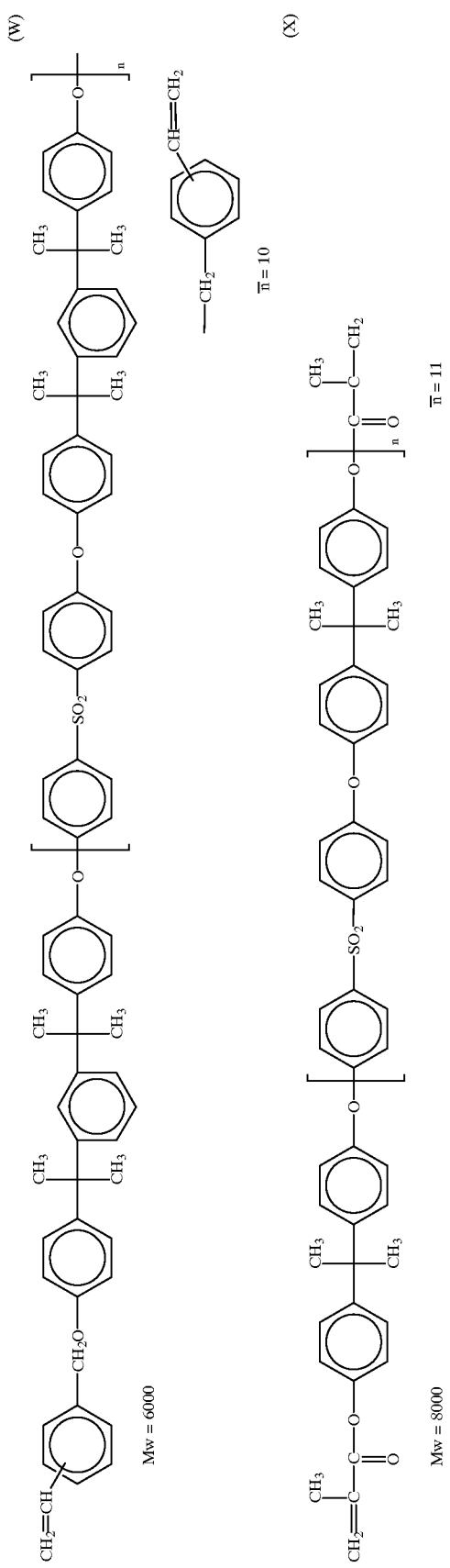

The method of synthesizing polyarylene polyethers employed in these Examples will be explained taking the polyarylene polyether (Compound T) represented by the formula (T) as an example out of aforementioned compounds.

A stirrer, a thermometer and a moisture meter equipped with a cooling tube were attached to a 3,000 ml four-necked flask. Then, one mole (228.29 g) of bisphenol A was charged in this flask, and subsequently dissolved by the addition of 700 ml of N-methylpyrolidone. Then, 80 g of sodium hydroxide was dissolved in 240 ml of water to form a solution, which is then added together with 100 ml of toluene to the solution of bisphenol A. Then, the resultant solution was heated with stirring for 2 hours at a temperature of 150° C. while azeotropically removing water together with toluene, whereby obtaining a sodium salt of bisphenol A.

To this reaction solution was added 100 ml of toluene together with 0.9 mole (258.45 g) of 4,4'-diphenyldichloro sulfone dissolved in 300 ml of N-methylpyrolidone. The resultant solution was heated at a temperature of 160° C. with stirring for 10 hours thereby allowing a reaction of the solution to take place while azeotropically removing water together with toluene, and then toluene was distilled off. After cooling the resultant solution down to room temperature, 0.22 mole (33.58g) of vinylbenzyl chloride was added to the solution, and then the resultant solution was allowed to react for 4 hours at a temperature of 60° C.

After the reaction solution was diluted by the addition of N-methylpyrolidone, salts therein were filtered off. The filtrate was then dripped into 10 liters of water, thus precipitating a polymer, which was then collected through filtration. The polymer thus obtained was dissolved into 1 liter of dichloromethane and washed with 300 ml of 1% aqueous solution of oxalic acid. After repeating this washing treatment twice, the polymer solution was further washed three times with 300 ml of water.

Subsequently, this polymer solution was poured into 10 liters of methanol thereby to precipitate the polymer, which was then collected through filtration and dried over 24 hours in a vacuum dryer heated to 50° C., whereby obtaining 370 g of light yellowish powdery polymer. The sodium ion concentration and chlorine ion concentration (extracted after boiling with hot water) of the polymer before the washing treatments with oxalic acid and water were 41 ppm and 520 ppm, respectively. Whereas, the sodium ion concentration and chlorine ion concentration of the polymer after the washing treatments were 0.8 ppm and 12 ppm respectively, indicating an enormous reduction in impurity concentration.

Likewise, the compounds {Compounds (S), (U), (V), (W) and (X)} represented by the formulas (S), (U), (V), (W) and (X) were synthesized and the impurity concentration and molecular weight thereof were measured. The Compounds (T') and (V') were the same with the Compounds (T) and (V) in chemical structure but differ in the content of impurities. The results measured are summarized in Table 1 below.

TABLE 1

|   | Content of impurities (ppm) | | | Molecular weight | |
|---|---|---|---|---|---|
|   | Na | K | Cl*[1] | $\overline{Mw}$ | $\overline{n}$ |
| S | 0.3 | 1.0 | 7 | 902 | 1 |
| T | 0.8 | 2.2 | 12 | 5000 | 10 |
| U | 0.5 | 0.3 | 8 | 3000 | 13 |
| V | 0.4 | 1.0 | 20 | 4000 | 8 |
| W | 1.0 | 0.4 | 10 | 6000 | 10 |
| X | 3.5 | 2.0 | 20 | 8000 | 11 |
| T' | 41 | 15 | 520 | 5000 | 10 |
| V' | 52 | 52 | 600 | 4000 | 8 |

*[1]Hydrolyzable Cl and Cl⁻ contained.

Then, eight kinds of polyarylene polyether synthesized as mentioned above, an inorganic filler, maleimide resin, a phenol resin curing agent, a curing catalyst, an adhesion-promoting agent, a release agent, a pigment, a surface treatment agent and a flame retardant were mixed in the ratios as shown in Table 2 to prepare the resin compositions of Examples 1 to 8. Moreover, a resin composition where the polyarylene polyether was replaced by an epoxy resin (Comparative Example 1), a resin composition where the polyarylene polyether was replaced by a polyphenylene sulfide resin (Comparative Example 3) and a resin composition where the inorganic filler was omitted (Comparative Example 2) were prepared, the mixing ratios thereof being shown in Table 2 below.

TABLE 2

|   | Examples (parts by weight) | | | | | | | | Comparative Examples (part by weight) | | |
|---|---|---|---|---|---|---|---|---|---|---|---|
|   | 1 | 2 | 3 | 4 | 5 | 6 | 7 | 8 | 1 | 2 | 3 |
|   | S | T | U | V | W | X | T' | V' | *4 | S | *5 |
|   | 18.6 | 20.0 | 15.5 | 11.0 | 12.0 | 10.0 | 15.0 | 11.0 | 15.6 | 90.0 | 58.8 |
| Inorganic filler | 80.0 | 70.0 | 75.0 | 75.0 | 75.0 | 75.0 | 75.0 | 75.0 | 75.0 | — | 40.0 |
| Maleimide | — | 4.6 | 2.8 | — | 6.0 | 4.6 | 4.6 | — | — | 4.6 | — |
| Phenol resin | — | 2.0 | 2.6 | 3.5 | 3.4 | 2.0 | 2.0 | 3.5 | 6.0 | 2.0 | — |
| Curing catalyst | 0.2 | 0.2 | 0.2 | 0.2 | 0.2 | 0.2 | 0.2 | 0.2 | 0.2 | 0.2 | — |
| Adhesion-promoting agent | — | — | *1 2.7 | *1 7.1 | *2 0.2 | *3 5.0 | — | — | — | | |
| Release agent | 0.5 | 0.5 | 0.5 | 0.5 | 0.5 | 0.5 | 0.5 | 0.5 | 0.5 | 0.5 | 0.5 |
| Pigment | 0.4 | 0.4 | 0.4 | 0.4 | 0.4 | 0.4 | 0.4 | 0.4 | 0.4 | 0.4 | 0.4 |
| Surface treatment agent | 0.3 | 0.3 | 0.3 | 0.3 | 0.3 | 0.3 | 0.3 | 0.3 | 0.3 | 0.3 | 0.3 |

TABLE 2-continued

|  | Examples (parts by weight) | | | | | | | | Comparative Examples (part by weight) | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| Flame retardant | — | 2.0 | — | 2.0 | 2.0 | 2.0 | 2.0 | 2.0 | 2.0 | 0.2 | — |

*1: Epoxy resin
*2: Zr chelate
*3: Unsaturated polyester
*4: Epoxy resin (the same with *1) was employed in place of polyarylene polyether
*5: Polyphenlene sulfide resin was employed in place of polyarylene polyether At the occasion of preparing the resin compositions, the inorganic filler was first treated using a surface treatment agent in a Henshel mixer. Then, each of the resin components, a curing catalyst, a curing agent and an adhesion-promoting agent shown in Table 2 were thermally fused thereby homogeneously mixing them, then cooled and pulverized. Then, the whole components were mixed together and kneaded using a heating roller heated to 60 to 130°, the resultant kneaded material being subsequently cooled and pulverized to obtain a resin composition.

The followings explain specific materials employed for each component shown in Table 2.
  Maleimide resin: N,N'-diphenylmethane bismaleimide (molecular weight:358)
  Epoxy resin: o-cresol novolak epoxy resin (ESCN 195XL, Sumitomo Kagaku Co., equivalent weight:358)
  Polyphenylene sulfide resin: (Aldrich reagent, Mn 10,000, Tm 285° C.)
  Curing agent: phenol novolak resin (BRG-557, Shouwa Kobunshi Co., equivalent weight:104)
  Curing catalyst: dicumyl peroxide
  Release agent: carnauba wax
  Pigment: carbon black (CB-30, Mitsubishi Kasei Co.)
  Flame retardant: antimony trioxide
  Inorganic filler: fused silica powder (average particle diameter:205 m)
  Surface treatment agent: γ-glycidoxypropyltrimethoxy silane (A-187, Nihon Unika Co.)
  Zr chelate: zirconium acetylacetate (Dojin Kagaku Shiyaku Co.)

The following evaluation tests were conducted on the resin compositions of these Examples 1 to 8 and Comparative Examples 1 to 3.

(1) Flexural modulus, flexural strength, thermal expansion coefficient, glass transition point, water absorption and adhesion strength:

Test pieces (8 mm×8 mm×4 mm) of each resin composition were prepared by way of transfer molding under the conditions of 175° C. and three minutes, the resultant molded pieces being after-cured over 4 hours at a temperature of 180° C. Flexural modulus, flexural strength, thermal expansion coefficient, glass transition point and water absorption were measured on each test piece. Further, adhesion strength in the direction of pull was also measured on each test piece. In the case of Comparative Example 3, the test pieces were prepared by way of injection molding by heating the resin composition at a temperature of 320° C.

The results obtained by these tests are shown in Table 3 below.

TABLE 3

|  | Examples | | | | | | | | Comparative Examples | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| Flexural modulus (kg/mm$^2$) | 1300 | 1320 | 1310 | 1250 | 1200 | 1150 | 1310 | 1250 | 1220 | 230 | 1200 |
| Flexural strength (kg/mm$^2$) | 13.0 | 13.0 | 11.8 | 12.6 | 12.8 | 11.9 | 12.8 | 12.6 | 8.5 | 6.0 | 9.5 |
| Thermal expansion coefficient (1/deg) × 10$^5$ | 1.2 | 2.0 | 1.5 | 1.5 | 1.6 | 1.7 | 1.5 | 1.6 | 1.6 | 6.5 | 5.2 |
| Glass transition point (°C.) | 220 | 200 | 180 | 180 | 190 | 200 | 200 | 180 | 155 | 170 | 90 |
| Water absorption (wt. %) | 0.20 | 0.30 | 0.40 | 0.41 | 0.25 | 0.23 | 0.32 | 0.41 | 0.60 | 0.75 | 0.35 |
| Adhesion strength (kg/cm$^2$) | 1.6 | 2.0 | 3.5 | 3.8 | 3.3 | 3.0 | 2.0 | 3.8 | 3.0 | 3.2 | 1.2 |

As clear from Table 3, the cured materials of the resin compositions of this invention (Examples 1 to 8) exhibited an excellent result in all of these features. Whereas, the cured materials of the resin compositions of Comparative Examples (Comparative Examples 1 to 3) failed to exhibit an excellent result in all of these features. Namely, the cured material of the resin composition of Comparative Example 1 showed a lower flexural strength and a higher water absorption as compared with the cured materials of resin compositions of Examples of this invention due to the employment of the epoxy resin in place of polyarylene polyether. In the case of Comparative Example 2, since it does not contain inorganic filler, the flexural modulus and flexural strength thereof were inferior and the thermal expansion coefficient and water absorption thereof were higher as compared with the cured materials of resin compositions of Examples of this invention. Further, in the case of Comparative Example 3, since it employed polyphenylene sulfide resin in place of polyarylene polyether, the minutes. This cycle was repeated 50 to 400 times to determine the percent defective by checking the performance characteristics of the device.

The results of these PCT test and TCT test are summarized in Table 4 below.

TABLE 4

|  |  | Examples |  |  |  |  |  |  |  | Comparative Examples |  |  |
|---|---|---|---|---|---|---|---|---|---|---|---|---|
|  |  | 1 | 2 | 3 | 4 | 5 | 6 | 7 | 8 | 1 | 2 | 3 |
| PCT test | Crack generation ratio after moisturizing test |  |  |  |  |  |  |  |  |  |  |  |
|  | Operation defective generation ratio | 0/20 | 0/20 | 0/20 | 0/20 | 0/20 | 0/20 | 0/20 | 0/20 | 0/20 | 0/20 | 0/20 |
|  | 100 hours | 0/20 | 0/20 | 0/20 | 0/20 | 0/20 | 0/20 | 0/20 | 0/20 | 2/20 | 3/20 | 0/20 |
|  | 200 hours | 0/20 | 0/20 | 0/20 | 0/20 | 0/20 | 0/20 | 0/20 | 0/20 | 6/20 | 5/20 | 0/20 |
|  | 300 hours | 0/20 | 0/20 | 0/20 | 0/20 | 0/20 | 0/20 | 2/20 | 5/20 | 11/20 | 12/20 | 5/20 |
|  | 400 hours | 0/20 | 0/20 | 0/20 | 0/20 | 0/20 | 0/20 | 5/20 | 7/20 | 12/20 | 19/20 | 8/20 |
|  | 500 hours | 0/20 | 0/20 | 0/20 | 0/20 | 0/20 | 0/20 | 10/20 | 9/20 | 15/20 | 20/20 | 10/20 |
| TCT test | 50 cycles | 0/20 | 0/20 | 0/20 | 0/20 | 0/20 | 0/20 | 0/20 | 0/20 | 0/20 | 12/20 | 10/20 |
|  | 100 cycles | 0/20 | 0/20 | 0/20 | 0/20 | 0/20 | 0/20 | 5/20 | 0/20 | 0/20 | 14/20 | 15/20 |
|  | 200 cycles | 0/20 | 0/20 | 0/20 | 0/20 | 0/20 | 0/20 | 10/20 | 0/20 | 0/20 | 20/20 | 18/20 |
|  | 300 cycles | 1/20 | 1/20 | 0/20 | 0/20 | 0/20 | 0/20 | 15/20 | 18/20 | 15/20 | — | 20/20 |
|  | 400 cycles | 2/20 | 1/20 | 0/20 | 0/20 | 0/20 | 0/20 | 20/20 | 20/20 | 18/20 | — | — |

The numbers shown represent (Number of defective/Number of sample)

melt viscosity becomes higher and the amount of inorganic filler could not be increased, so that the flexural strength thereof was inferior, the thermal expansion coefficient thereof was higher, the glass transition point thereof was low and the adhesion strength thereof was inferior as compared with the cured materials of resin compositions of Examples of this invention.

(2) Moisture resistance:

For the purpose of investigating the moisture resistance of these resin compositions, the following PCT test was performed. Namely, each resin composition was used to prepare a test device (8 mm×8 mm) which was sealed according to the TQFP package. Then, the test device was subjected to after-curing over 4 hours at a temperature of 180° C. to prepare a resin-molded semiconductor device. Each of the resin-molded semiconductor devices was then left in an atmosphere 85% in relative humidity and 85° C. in temperature for 72 hours, thus performing a moisture absorption treatment. Then, the resin-molded semiconductor device was exposed to a fluorocarbon vapor atmosphere heated to 125° C. for one minute to investigate the ratio of generating cracks in the package at this stage. Furthermore, this resin-molded semiconductor device was left in a saturated water vapor heated to 127° C. for a predetermined period of time to investigate the percent defective (defective due to leakage and defective due to opening), thus evaluating the moisture resistance.

(3) Thermal shock resistance:

For the purpose of investigating the thermal shock resistance of these resin compositions, the following TCT test was performed. Namely, each resin composition was used to prepare a test device (8 mm×8 mm) of large size for a thermal shock resistance, which was sealed according to the TQFP package. Then, the test device was subjected to after-curing over 4 hours at a temperature of 180° C. to prepare a resin-molded semiconductor device. However, the after-cure treatment was not performed on the test device of Comparative Example 3. Each of the resin-molded semiconductor devices was then subjected to a thermal shock cycle, one cycle thereof being consisted of −65° C. for 20 minutes/room temperature for 50 minutes/150° C. for 20

As apparent from Table 4, in the PCT test, almost any defective was not found in the resin-molded semiconductor devices according to Examples of this invention even if the resin-molded semiconductor devices were left in a saturated water vapor atmosphere for 500 hours. In the TCT test also, almost any defective was not found in the resin-molded semiconductor devices according to Examples of this invention even if the resin-molded semiconductor devices were subjected to the thermal shock cycle which was repeated 400 times.

By contrast, in the case of the resin-molded semiconductor device according to Comparative Example 1, the percent defective thereof in the PCT test was found to be relatively high due to its high water absorption. Further, in the case of the resin-molded semiconductor device according to Comparative Example 2, the percent defective thereof in the PCT test was found to be relatively high due to its high water absorption, and at the same time, the percent defective thereof in the TCT test was also found to be relatively high due to its high thermal expansion coefficient. Furthermore, in the case of the resin-molded semiconductor device according to Comparative Example 3, the percent defective thereof in the TCT test was found to be relatively high due to its high thermal expansion coefficient.

When the resin compositions of Examples 1 and 3 which contain no flame retardant were subjected to a flammability test, they indicated V-0 in the UL standard, thus indicating a satisfactory flame resistance. Since the disposal of a resin containing a flame retardant such as antimony or bromides is rather difficult, the resin composition according to this invention which exhibits a satisfactory flame resistance even though it contains no flame retardant would be also very advantageous in the disposal thereof.

EXAMPLES 9 TO 14

In these Examples, the polyarylene polyethers represented by the aforementioned formulas (G) to (L) were employed as the (a) component in the resin composition according to the second embodiment of this invention.

First of all, the method of synthesizing polyarylene polyethers employed in these Examples will be explained taking the polyarylene polyether represented by the formula (I) as an example out of aforementioned compounds.

A stirrer, a thermometer and a moisture meter equipped with a cooling tube were attached to a 3,000 ml four-necked flask. Then, one mole (228.29 g) of bisphenol A was charged in this flask, and subsequently dissolved by the addition of 700 ml of N-methylpyrolidone. Then, 80 g of sodium hydroxide was dissolved in 240 ml of water to form a solution, which is then added together with 100 ml of toluene to the solution of bisphenol A. Then, the resultant solution was heated with stirring for 2 hours at a temperature of 150° C. while azeotropically removing water together with toluene, whereby obtaining a sodium salt of bisphenol A.

To this reaction solution was added 100 ml of toluene together with 0.9 g (258.45g) of 4,4'-diphenyldichloro sulfone dissolved in 300 ml of N-methylpyrolidone. The resultant solution was heated at a temperature of 160° C. with stirring for 10 hours thereby allowing a reaction of the solution to take place while azeotropically removing water together with toluene, and then toluene was distilled off to obtain a sodium salt of polysulfone. After cooling the reaction solution down to room temperature, 0.40 mole (37.0 g) of epichlorohydrine was added to the reaction solution, and then the resultant solution was allowed to react for 4 hours at a temperature of 60° C.

After the reaction solution was diluted by the addition of N-methylpyrolidone, salts therein were filtered off. The filtrate was then dripped into 10 liters of water, precipitating a polymer, which was then collected through filtration. The polymer thus obtained was dissolved into 1 liter of dichloromethane and washed with 300 ml of 1% aqueous solution of oxalic acid. After repeating this washing treatment twice, the polymer solution was further washed three times with 300 ml of water.

Subsequently, this polymer solution was poured into 10 liters of methanol thereby to precipitate the polymer, which was then collected through filtration and dried over 24 hours in a vacuum dryer heated to 50° C., whereby obtaining 370 g of light yellowish powdery polymer. The sodium ion concentration and chlorine ion concentration (extracted after boiling with hot water) of the polymer before the washing treatments with oxalic acid and water were 41 ppm and 520 ppm, respectively. Whereas, the sodium ion concentration and chlorine ion concentration of the polymer after the washing treatments were 0.8 ppm and 12 ppm respectively, indicating an enormous reduction in impurity concentration.

Likewise, eight kinds of compounds represented by the formulas (G), (H), (J) to (L) as well as compounds (H') and (J') which were the same with the compounds (H) and (J) in chemical structure but differ in the content of impurities were synthesized. The compounds G1 and G2 were the same in general formula with each other but differ in molecular weight, in the repeating number of repeating unit (n) and in epoxy equivalent. The contents of impurities in these compounds and the molecular weight of these compounds as measured are summarized in Table 5 below.

TABLE 5

| Compounds of | Content of impurities (ppm) | | | Molecular | | Epoxy |
|---|---|---|---|---|---|---|
| (a) component | Na | K | Cl*1 | weight | n | equivalent |
| G1 | 0.9 | 2.2 | 15 | 3500 | 15 | 2500 |
| H | 0.8 | 1.0 | 22 | 5000 | 11 | 3100 |
| I | 0.6 | 0.3 | 12 | 4800 | 8 | 2700 |
| J | 0.5 | 1.5 | 20 | 1100 | 2 | 600 |
| K | 0.7 | 0.6 | 10 | 7000 | 15 | 3900 |
| L | 1.5 | 2.0 | 18 | 4500 | 11 | 2500 |
| G2 | 2.6 | 3.2 | 27 | 9500 | 40 | 5500 |
| H' | 50.6 | 20.2 | 560 | 4800 | 8 | 2700 |
| J' | 70.0 | 11.7 | 515 | 12000 | 28 | 7000 |

*1: Hydrolyzable Cl and Cl⁻ contained.

Next, the preparation of the resin compositions according to the second embodiment of this invention will be explained as follows. First of all, the compound (G) constituting the component (a), a curing agent constituting the component (b), an inorganic filler constituting the component (c), a curing catalyst, a release agent, a pigment and a surface treatment agent were mixed in the ratios as shown in Table 6 to prepare the resin compositions of Example 9. Likewise, the compound constituting the (a) component and mixing ratios of each component were altered to prepare the resin compositions of Examples 10 to 14. Moreover, the resin compositions of Comparative Examples 4 to 6 were prepared, the mixing ratios thereof being shown in Table 6 below.

TABLE 6

| | Examples | | | | | |
|---|---|---|---|---|---|---|
| | 9 | 10 | 11 | 12 | 13 | 14 |
| (a) component | G1 | H | I | J | K | H' |
| | 20.0 | 18.0 | 32.0 | 18.0 | 21.1 | 18.0 |
| (b) component | Diaminophenyl sulfone | *1 Phenol novolak resin | Trimethylol allyoxy phenol | Tris (dimethyl-laminomethyl) phenol | Methane diamine | *1 Phenol novolak resin |
| | 1.0 | 1.0 | 0.6 | 7.6 | 0.3 | |
| Inorganic filler | 77.6 | 77.6 | 62.0 | 73.0 | 77.0 | 77.6 |
| Curing catalyst | 0.2 | 0.2 | 0.2 | 0.2 | 0.2 | 0.2 |
| Adhesion-promoting agent | — | — | *4 3.1 | — | *5 0.2 | — |
| Release agent | 0.5 | 0.5 | 0.5 | 0.5 | 0.5 | 0.5 |

TABLE 6-continued

| | | | | | | |
|---|---|---|---|---|---|---|
| Pigment | 0.4 | 0.4 | 0.4 | 0.4 | 0.4 | 0.4 |
| Surface treatment agent | 0.3 | 0.3 | 0.3 | 0.3 | 0.3 | 0.3 |
| Flame retardant | — | 2.0 | 2.0 | — | — | 2.0 |

| | Comparative Examples | | |
|---|---|---|---|
| | 4 | 5 | 6 |
| (a) component | J<br>25.6 | G1<br>93.9 | *2 Bisphenol A glycidylether resin<br>10.8 |
| (b) component | — | Diaminophenyl sulfone<br>4.7 | *3 Phenol novolak resin<br>8.2 |
| Inorgnic filler | 73.0 | — | 77.6 |
| Curing catalyst | 0.2 | 0.2 | 0.2 |
| Adhesion-promoting agent | — | — | — |
| Release agent | 0.5 | 0.5 | 0.5 |
| Pigment | 0.4 | 0.4 | 0.4 |
| Surface treatment agent | 0.3 | 0.3 | 0.3 |
| Flame retardant | — | — | 2.0 |

*1: MW 486
*2: General-purpose epoxy (epoxy equivalent: 200) resin was used in place of (a) component
*3: Mw 486
*4: Silicone rubber
*5: Zr chelate At the occasion of preparing the resin compositions, the inorganic filler was first treated using a surface treatment agent in a Henshel mixer. Then, each of the resin components, a curing catalyst, a curing agent and an adhesion-promoting agent shown in Table 6 were thermally fused thereby homogeneously mixing them, then cooled and pulverized. Then, the whole components were mixed together and kneaded using a heating roller heated to 60 to 160° C., the resultant kneaded material being subsequently cooled and pulverized to obtain a resin composition.

The followings explain specific materials employed for each component shown in Table 6.
  Curing catalyst: triphenyl sulfone
  Release agent: carnauba wax
  Pigment: carbon black
  Flame retardant: antimony trioxide
  Inorganic filler: fused silica powder (average particle diameter:205m)
  Surface treatment agent: γ-glycidoxypropyltrimethoxy silane (A-187, Nihon Unika Co.)
  Zr chelate: zirconium acetylacetate (Dojin Kagaku Shiyaku Co.)

The following evaluation tests were conducted on the resin compositions of these Examples 9 to 14 and Comparative Examples 4 to 6.

(1) Flexural modulus, flexural strength, thermal expansion coefficient, glass transition point, water absorption and adhesion strength:

The tests were performed in the same manner as in the cases of Examples 1 to 8 thereby measuring and evaluating the flexural modulus, flexural strength, thermal expansion coefficient, glass transition point, water absorption and adhesion strength on each test piece. The results obtained by these tests are shown in Table 7 below.

TABLE 7

| | Examples | | | | | | Comparative Examples | | |
|---|---|---|---|---|---|---|---|---|---|
| | 9 | 10 | 11 | 12 | 13 | 14 | 4 | 5 | 6 |
| Flexural modulus (kg/mm$^2$) | 1310 | 1280 | 1140 | 1260 | 1310 | 1230 | 680 | 220 | 1210 |
| Flexural strength (kg/mm$^2$) | 12.3 | 11.6 | 11.2 | 12.0 | 12.5 | 11.1 | 8.0 | 6.0 | 8.6 |
| Thermal expansion coefficient (1/deg) × 10$^5$ | 1.5 | 1.5 | 1.9 | 1.7 | 1.5 | 1.5 | 1.5 | 7.0 | 1.8 |
| Glass transition point (°C.) | 165 | 155 | 158 | 160 | 167 | 153 | 107 | 133 | 151 |
| Water absorption (wt. %) | 0.20 | 0.21 | 0.22 | 0.26 | 0.22 | 0.22 | 0.26 | 0.74 | 0.60 |
| Adhesion strength (kg/cm$^2$) | 2.5 | 2.6 | 2.8 | 2.9 | 2.4 | 2.6 | 0.9 | 1.1 | 3.0 |

As clear from Table 7, the cured materials of the resin compositions of this invention (Examples 9 to 14) exhibited an excellent result in all of these features. Whereas, the cured materials of the resin compositions of Comparative Examples (Comparative Examples 4 to 6) failed to exhibit an excellent result in all of these features. Namely, the cured material of the resin composition of Comparative Example 4 was found to be inferior in flexural modulus, flexural strength and adhesion strength as compared with the cured materials of resin compositions of Examples of this invention, since it contained no curing agent. In the case of Comparative Example 5, since it does not contain inorganic filler, the flexural modulus and flexural strength thereof were inferior and the thermal expansion coefficient and water absorption thereof were higher as compared with the cured materials of resin compositions of Examples of this invention. Further, in the case of the cured material of resin composition of Comparative Example 6, since it employs a general-purpose epoxy resin in place of polyarylene polyether, the flexural modulus thereof was inferior and the water absorption thereof was higher as compared with the cured materials of resin compositions of Examples of this invention.

(2) Moisture resistance:

For the purpose of investigating the moisture resistance of these. resin compositions, the PCT test was performed in the same manner as in the case of Examples 1 to 8.

(3) Thermal shock resistance:

For the purpose of investigating the thermal shock resistance of these resin compositions, the TCT test was performed in the same manner as in the case of Examples 1 to 8.

The results of these PCT test and TCT test are summarized in Table 8 below.

The resin composition of Example 14 was prepared by using the same materials as those employed in the resin composition of Example 10 except that the content of impurities in the polyarylene polyether was higher than that in the polyarylene polyether of Example 10. When the results between these Examples are compared with each other, the resin composition of Example 10 containing less content of impurities gives a lower percent defective as compared with the resin composition of Example 14.

When the resin compositions of Examples 9 and 12 which contain no flame retardant were subjected to a flammability test, they indicated V-0 in the UL standard, thus indicating a satisfactory flame resistance. Since the disposal of a resin containing a flame retardant such as antimony or bromides is known to be rather difficult raising an environmental problem, the resin composition according to this invention which exhibits a satisfactory flame resistance even though it contains no flame retardant would be also very advantageous in the disposal thereof.

EXAMPLES 15 TO 18

In these Examples, the polyarylene polyethers having a hydroxyl group on each of both terminal portions and represented by the aforementioned formulas (P), (M) and (N) were employed as the (b) component in the resin composition according to the third embodiment of this invention.

First of all, the method of synthesizing polyarylene polyethers employed in these Examples will be explained taking

TABLE 8

|  |  | Examples |  |  |  |  |  | Comparative Examples |  |  |
|---|---|---|---|---|---|---|---|---|---|---|
|  |  | 9 | 10 | 11 | 12 | 13 | 14 | 4 | 5 | 6 |
| PCT test | Crack generation ratio after moisturizing test Defective percent | 0/20 | 0/20 | 0/20 | 0/20 | 0/20 | 1/20 | 5/20 | 18/20 | 8/20 |
|  | 100 hours | 0/20 | 0/20 | 0/20 | 0/20 | 0/20 | 1/20 | 6/20 | 20/20 | 13/20 |
|  | 200 hours | 0/20 | 0/20 | 0/20 | 0/20 | 0/20 | 1/20 | 10/20 | — | 20/20 |
|  | 300 hours | 0/20 | 1/20 | 2/20 | 0/20 | 0/20 | 3/20 | 17/20 | — | — |
|  | 400 hours | 1/20 | 1/20 | 2/20 | 1/20 | 1/20 | 5/20 | 20/20 | — | — |
|  | 500 hours | 2/20 | 2/20 | 2/20 | 1/20 | 1/20 | 5/20 | — | — | — |
| TCT test | 50 cycles | 0/20 | 0/20 | 0/20 | 0/20 | 0/20 | 0/20 | 12/20 | 20/20 | 9/20 |
|  | 100 cycles | 0/20 | 0/20 | 0/20 | 0/20 | 0/20 | 0/20 | 20/20 | — | 18/20 |
|  | 200 cycles | 0/20 | 1/20 | 3/20 | 1/20 | 0/20 | 2/20 | — | — | 20/20 |
|  | 300 cycles | 1/20 | 2/20 | 5/20 | 1/20 | 0/20 | 2/20 | — | — | — |
|  | 400 cycles | 1/20 | 2/20 | 5/20 | 1/20 | 1/20 | 3/20 | — | — | — |

The numbers shown represent (Number of defective/Number of sample)

As apparent from Table 8, in the PCT test, almost any defective was not found in the resin-molded semiconductor devices according to Examples of this invention even if the resin-molded semiconductor devices were left in a saturated water vapor atmosphere for 500 hours. In the TCT test also, almost any defective was not found in the resin-molded semiconductor devices according to Examples of this invention even if the resin-molded semiconductor devices were subjected to the thermal shock cycle which was repeated 400 times.

By contrast, in the case of the resin-molded semiconductor device according to Comparative Examples 4 to 6, the percent defective thereof in the PCT test as well as in the TCT test was found to be relatively high. In particular, in the case of the resin-molded semiconductor device according to Comparative Example 4, the percent defective thereof in the PCT test was found to be relatively high due to its high water absorption, and at the same time, the percent defective thereof in the TCT test was also found to be relatively high due to its high thermal expansion coefficient.

the polyarylene polyether represented by the formula (N) as an example out of aforementioned compounds.

First of all, a solution of sodium salt of polysulfone was manufactured in the same manner with the use of the same amount of raw reaction materials as in the case of synthesizing the compound represented by the aforementioned formula (I).

After the reaction solution was filtered to remove the salts therein, the filtrate was then dripped into 10 liters of 1% aqueous solution of oxalic acid to precipitate a polymer, which was then collected through filtration. The polymer thus obtained was dissolved into 1 liter of dichloromethane and washed with 300 ml of 1% aqueous solution of oxalic acid. After repeating this washing treatment twice, the polymer solution was further washed three times with 300 ml of water.

Subsequently, this polymer solution was poured into 10 liters of methanol thereby to precipitate the polymer, which was then collected through filtration and dried over 24 hours in a vacuum dryer heated to 50° C., whereby obtaining 400 g of light yellowish powdery polymer. The sodium ion concentration and chlorine ion concentration (extracted after boiling with hot water) of the polymer before the washing treatments with oxalic acid and water were 60 ppm and 520 ppm, respectively. Whereas, the sodium ion concentration and chlorine ion concentration of the polymer after the washing treatments were 0.7 ppm and 10 ppm respectively, indicating an enormous reduction in impurity concentration.

Likewise, three kinds of compounds represented by the formulas (P) and (M) as well as compounds represented by the formulas (P') which was the same with the compounds (P) in chemical structure but differs in the content of impurities were synthesized. The contents of impurities in these compounds and the molecular weight of these compounds as measured are summarized in Table 9 below.

TABLE 9

| Compounds of (a) component | Content of impurities (ppm) | | | n | Phenol equivalent |
|---|---|---|---|---|---|
| | Na | K | Cl*1 | | |
| N | 0.8 | 0.3 | 12 | 4 | 1000 |
| P | 0.6 | 0.1 | 10 | 2 | 500 |
| P' | 52.0 | 3.0 | 600 | 2 | 500 |
| M | 0.3 | 0.1 | 10 | 6 | 700 |

Next, the preparation of the resin compositions according to the third embodiment of this invention will be explained as follows. First of all, bisphenol A glycidyl ether constituting the component (a), the compound (N) constituting the component (b), an inorganic filler constituting the component (c), a curing catalyst, a release agent, a pigment, a surface treatment agent and a flame retardant were mixed in the ratios as shown in Table 10 to prepare the resin compositions of Example 15. Likewise, the compound having an epoxy group and constituting the (a) component and mixing ratios of each component were altered to prepare the resin compositions of Examples 16 to 18. Moreover, the resin composition of Comparative Example 7 was prepared, the mixing ratios thereof being shown in Table 10 below.

At the occasion of preparing the resin compositions, the inorganic filler was first treated using a surface treatment agent in a Henshel mixer. Then, each one of the resin components, a curing catalyst, a curing agent and an adhesion-promoting agent shown in Table 10 were thermally fused thereby homogeneously mixing them, then cooled and pulverized. Then, the whole components were mixed together and kneaded using a heating roller heated to 60 to 160° C., the resultant kneaded material being subsequently cooled and pulverized to obtain a resin composition.

The specific materials of the components shown in Table 10 were the same as those employed in the Examples 9 to 14.

The following evaluation tests were conducted on the resin compositions of these Examples 15 to 18 and Comparative Example 7.

(1) Flexural modulus, flexural strength, thermal expansion coefficient, glass transition point, water absorption and adhesion strength:

The tests were performed in the same manner as in the cases of Examples 1 to 8 thereby measuring and evaluating the flexural modulus, flexural strength, thermal expansion coefficient, glass transition point, water absorption and adhesion strength on each test piece. The results obtained by these tests are shown in Table 11 below.

TABLE 11

| | Examples | | | | Comparative Examples |
|---|---|---|---|---|---|
| | 15 | 16 | 17 | 18 | 7 |
| Flexural modulus (kg/mm$^2$) | 1270 | 1330 | 1300 | 1280 | 760 |
| Flexural strength (kg/mm$^2$) | 12.1 | 12.6 | 12.4 | 11.7 | 9.0 |
| Thermal expansion coefficient (1/deg) × 10$^5$ | 1.4 | 1.6 | 1.6 | 1.6 | 1.6 |
| Glass transition point (°C.) | 152 | 154 | 153 | 150 | 126 |
| Water absorption (wt. %) | 0.19 | 0.25 | 0.26 | 0.24 | 0.25 |
| Adhesion strength (kg/cm$^2$) | 2.8 | 3.0 | 2.9 | 3.2 | 0.8 |

As clear from Table 11, the cured materials of the resin compositions of this invention (Examples 15 to 18) exhib-

TABLE 10

| | Examples | | | | Comparative examples |
|---|---|---|---|---|---|
| | 15 | 16 | 17 | 18 | 7 |
| (a) Component | *2 Bisphenol A glycidyl ether resin | J | J' | *3 Dihydroxydiphenyl glycidyl ether resin | — |
| | | 13.2 | 13.2 | | |
| (b) Component | N | P | P' | M | M |
| | 13.7 | 10.4 | 10.4 | 18.3 | 75.0 |
| Inorganic filler | 80.0 | 75.0 | 75.0 | 75.0 | 62.0 |
| Curing catalyst | 0.2 | 0.2 | 0.2 | 0.2 | 0.2 |
| Adhesion-promoting agent | — | — | — | — | — |
| Release agent | 0.5 | 0.5 | 0.5 | 0.5 | 0.5 |
| Pigment | 0.4 | 0.4 | 0.4 | 0.4 | 0.4 |
| Surface treatment agent | 0.3 | 0.3 | 0.3 | 0.3 | 0.3 |
| Flame retardant | 2.0 | — | — | — | — |

*2: Epoxy equivalent 200,
*3: Epoxy equivalent 191 ited an excellent result in all of these features. Whereas, the cured material of the resin composition of Comparative Example 7 failed to exhibit an excellent result in all of these features. Namely, the cured material of the resin composition of Comparative Example 7 was found to be inferior in flexural modulus, flexural strength and adhesion strength as compared with the cured materials of resin compositions of Examples of this invention, since a compound having an epoxy group was not employed therein.

(2) Moisture resistance:

For the purpose of investigating the moisture resistance of these resin compositions, the PCT test was performed in the same manner as in the case of Examples 1 to 8.

(3) Thermal shock resistance:

For the purpose of investigating the thermal shock resistance of these resin compositions, the TCT test was performed in the same manner as in the case of Examples 1 to 8.

The results of these PCT test and TCT test are summarized in Table 12 below.

TABLE 12

|  |  | Examples | | | | Comparative Examples |
|---|---|---|---|---|---|---|
|  |  | 15 | 16 | 17 | 18 | 7 |
| PCT test | Crack generation ratio after moisturizing test Defective percent | 0/20 | 0/20 | 0/20 | 0/20 | 3/20 |
|  | 100 hours | 0/20 | 0/20 | 2/20 | 0/20 | 4/20 |
|  | 200 hours | 0/20 | 0/20 | 2/20 | 1/20 | 6/20 |
|  | 300 hours | 0/20 | 1/20 | 4/20 | 1/20 | 13/20 |
|  | 400 hours | 0/20 | 2/20 | 4/20 | 1/20 | 20/20 |
|  | 500 hours | 0/20 | 3/20 | 6/20 | 2/20 | — |
| TCT test | 50 cycles | 0120 | 0/20 | 0/20 | 0/20 | 2/20 |
|  | 100 cycles | 1/20 | 1/20 | 2/20 | 0/20 | 5/20 |
|  | 200 cycles | 1/20 | 1/20 | 3/20 | 1/20 | 7/20 |
|  | 300 cycles | 2/25 | 1/20 | 3/20 | 3/20 | 10/20 |
|  | 400 cycles | 2/25 | 1/20 | 4/20 | 3/20 | 18/20 |

The numbers shown represent (Number of defective/Number of sample)

As apparent from Table 12, in the PCT test, almost any defective was not found in the resin-molded semiconductor devices according to Examples of this invention even if the resin-molded semiconductor devices were left in a saturated water vapor atmosphere for 500 hours. In the TCT test also, almost any defective was not found in the resin-molded semiconductor devices according to Examples of this invention even if the resin-molded semiconductor devices were subjected to the thermal shock cycle which was repeated 400 times.

By contrast, in the case of the resin-molded semiconductor device according to Comparative Example 7, the percent defective thereof in the PCT test as well as in the TCT test was found to be relatively high.

The resin composition of Example 17 was prepared by using the same materials as those employed in the resin composition of Example 16 except that the content of impurities in the polyarylene polyether was higher than that in the polyarylene polyether of Example 16. When the results between these Examples are compared with each other, the resin composition of Example 16 containing less content of impurities gives a lower percent defective as compared with the resin composition of Example 17.

EXAMPLES 19 TO 21

181g (25.3 parts by weight) of the compound represented by the formula (J) (epoxy equivalent:600) as shown in Table 5 and constituting the component (a), 24 g (3.3 parts by weight) of benzophenone tetracarboxylic acid dianhydride (BTDA) as a curing agent constituting the component (b), 500 g (70.0 parts by weight) of an inorganic filler, 1.4 g (0.2 parts by weight) of a curing catalyst, 3.6 g (0.5 parts by weight) of a release agent, 2.9 g (0.4 parts by weight) of a pigment, and 2.1 g (0.3 parts by weight) of a surface treatment agent were mixed and treated in the same manner as explained in Examples 9 to 18 to prepare the resin composition of Example 19.

135g (18.9 parts by weight) of the compound represented by the formula (P) (phenol equivalent:500) shown in Table 9, 14.3 g (2.0 parts by weight) of benzophenone tetracarboxylic acid dianhydride (BTDA), 55 g (7.7 parts by weight) of 3,3', 5,5'-tetramethyl-4,4'-diglycidyloxybiphenyl resin (epoxy equivalent:600), 3.6 g (0.5 parts by weight) of a release agent, and 2.9 g (0.4 parts by weight) of a pigment were employed and thermally fused together to obtain a mixture, to which 1.4 g (0.2 parts by weight) of a curing catalyst was added and intermixed therein. The resultant mixture was then cooled and pulverized. Subsequently, to this pulverized resin composition was added 500 g (70.0 parts by weight) of an inorganic filler pretreated in advance with 2.1 g (0.3 parts by weight) of a surface-treatment agent. The resultant mixture was then kneaded using a heating roller heated to 120° C., cooled and pulverized to obtain a resin composition of the resin composition of Example 20.

In this case, the addition of the curing catalyst was performed after the curing agent and the epoxy compound were intermixed together, since the curing of the resin can not proceed smoothly if the curing catalyst is added from the beginning.

Additionally, 84.28 g (11.8 parts by weight) of the compound represented by the formula (Y) (carboxylic acid equivalent:500) as shown below and constituting the component (b) of the resin composition according to the second embodiment of this invention, 120 g (16.8 parts by weight) of the compound represented by the formula (J) (epoxy equivalent:600) as shown in Table 5 and constituting the component (a), 500 g (70.0 parts by weight) of an inorganic filler, 1.4 g (0.2 parts by weight) of a curing catalyst, 3.6 g (0.5 parts by weight) of a release agent, 2.9 g (0.4 parts by weight) of a pigment, and 2.1 g (0.3 parts by weight) of a surface treatment agent were mixed and treated in the same manner as explained in Examples 9 to 18 to prepare the resin composition of Example 21.

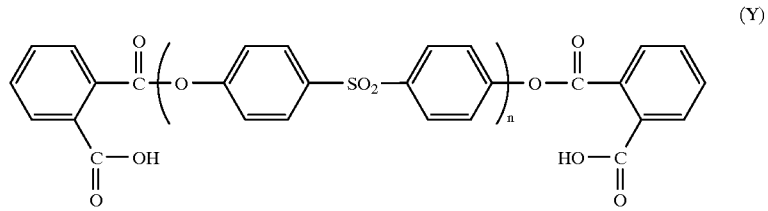

(Y)

In these resin compositions, the specific materials for the inorganic filler, the curing catalyst, the release agent, the pigment and the surface treatment agent employed therein were the same as those employed in the Examples 9 to 18. These resin compositions thus obtained were evaluated in the same manner as in Examples 1 to 8.

The results of these evaluation are summarized in the following Tables 13 and 14.

TABLE 13

|  | Examples | | |
|---|---|---|---|
|  | 19 | 20 | 21 |
| Flexural modulus (kg/mm$^2$) | 1260 | 1270 | 1300 |
| Flexural strength (kg/mm$^2$) | 12.0 | 12.1 | 12.4 |
| Thermal expansion coefficient (1/deg) × 10$^5$ | 1.7 | 1.4 | 1.6 |
| Glass transition point (°C.) | 160 | 152 | 153 |
| Water absorption (wt.%) | 0.26 | 0.19 | 0.26 |
| Adhesion strength (kg/cm$^2$) | 2.9 | 2.8 | 2.9 |

TABLE 14

| Examples | | 19 | 20 | 21 |
|---|---|---|---|---|
| PCT test | Crack generation ratio after moisturizing treatment | 0/20 | 1/20 | 0/20 |
|  | Defective percent | | | |
| TCT test | 100 hours | 0/20 | 1/20 | 0/20 |
|  | 200 hours | 0/20 | 1/20 | 0/20 |
|  | 300 hours | 0/20 | 3/20 | 0/20 |
|  | 400 hours | 1/20 | 5/20 | 0/20 |
|  | 500 hours | 1/20 | 5/20 | 0/20 |
|  | 50 cycles | 0/20 | 0/20 | 0/20 |
|  | 100 cycles | 0/20 | 0/20 | 1/20 |
|  | 200 cycles | 1/20 | 2/20 | 1/20 |
|  | 300 cycles | 1/20 | 2/20 | 2/25 |
|  | 400 cycles | 1/20 | 3/20 | 2/25 |

As clear from Tables 13 and 14, the cured materials of the resin compositions of this invention (Examples 19 to 21) exhibited an excellent result in all of these features.

EXAMPLES 22 TO 30

The polyarylene polyether represented by the aforementioned formula (B) was synthesized in the same manner as in Example 1. The sodium ion concentration and chlorine ion concentration (extracted after boiling with hot water) of the polymer before the washing treatments with oxalic acid and water were 41 ppm and 520 ppm, respectively. Whereas, the sodium ion concentration and chlorine ion concentration of the polymer after the washing treatments were 0.8 ppm and 12 ppm respectively, indicating an enormous reduction in impurity concentration.

Likewise, the polyarylene polyethers represented by the formulas (A) and (C) to (F) were synthesized. The contents of impurities in these compounds and the molecular weight of these compounds as measured are summarized in Table 15 below. The compounds (B') and (D') were the same with the compounds (B) and (D) in chemical structure but differ in the content of impurities were synthesized. The compounds A1 and A2 were the same in general formula with each other but differ in molecular weight and in the repeating number of repeating unit (n).

TABLE 15

| Compounds | Content of impurities (ppm) | | | Molecular weight | |
|---|---|---|---|---|---|
|  | Na | K | Cl*$^1$ | Mw | n |
| A1 | 0.8 | 2.2 | 15 | 6600 | 27 |
| B | 0.6 | 1.0 | 22 | 8000 | 17 |
| C | 0.5 | 0.3 | 12 | 5000 | 8 |
| D | 0.4 | 1.5 | 20 | 12500 | 29 |
| E | 0.7 | 0.6 | 10 | 9000 | 20 |
| F | 1.2 | 2.0 | 18 | 6000 | 14 |
| A2 | 2.1 | 3.2 | 27 | 15000 | 64 |
| B' | 45.6 | 20.2 | 560 | 8000 | 17 |
| D' | 65.0 | 11.7 | 515 | 12500 | 29 |

*$^1$: Hydrolyzable Cl and Cl$^-$ contained.

Next, the preparation of the resin compositions according to the fourth embodiment of this invention will be explained as follows. First of all, the compound (A) constituting the component (a), an inorganic filler constituting the component (b), a compound having a molecular weight of 5,000 or less constituting the component (c), a curing catalyst, a release agent, a pigment and a surface treatment agent were mixed in the ratios as shown in Table 16 to prepare the resin compositions of Example 22. Likewise, the compound constituting the (a) component and mixing ratios of each component were altered to prepare the resin compositions of Examples 23 to 30. Moreover, the resin compositions of Comparative Examples 8 to 11 were prepared wherein the (a) components were changed to an epoxy resin or other compounds falling outside the compositions of this invention, and an inorganic filler was not employed at all in Comparative Example 9.

TABLE 16

| | Examples (parts by weight) | | | | | | | | |
|---|---|---|---|---|---|---|---|---|---|
| | 22 | 23 | 24 | 25 | 26 | 27 | 28 | 29 | 30 |
| (a) Component | A1 | B | C | D | E | F | A2 | B' | D' |
| | 20.0 | 18.0 | 30.0 | 23.6 | 20.0 | 20.0 | 17.4 | 18.0 | 23.6 |
| (c) Component | 1.0 | 1.0 | 1.5 | 1.2 | 1.4 | 1.0 | 1.2 | 1.0 | 2.0 |
| | Diaryl phthalate | *1 B" n = 1 | Diaryl isophthalate | *7 | Divinyl benzene | Diethylene glycol diacrylate | Diaryl phthalate | *1 B" n = 1 | *7 |
| Inorganic filler | 77.6 | 77.6 | 62.0 | 73.0 | 77.0 | 75.0 | 80.0 | 77.6 | 73.0 |
| Curing catalyst | 0.2 | 0.2 | 0.2 | 0.2 | 0.2 | 0.2 | 0.2 | 0.2 | 0.2 |
| Adhesion-promoting agent | — | — | *2 3.1 | — | *3 0.2 | *4 2.0 | — | — | — |
| Release agent | 0.5 | 0.5 | 0.5 | 0.5 | 0.5 | 0.5 | 0.5 | 0.5 | 0.5 |
| Pigment | 0.4 | 0.4 | 0.4 | 0.4 | 0.4 | 0.4 | 0.4 | 0.4 | 0.4 |
| Surface treatment agent | 0.3 | 0.3 | 0.3 | 0.3 | 0.3 | 0.3 | 0.3 | 0.3 | 0.3 |
| Flame retardant | — | 2.0 | 2.0 | — | — | — | — | 2.0 | — |

| | Comparative Examples (parts by weight) | | | |
|---|---|---|---|---|
| | 8 | 9 | 10 | 11 |
| (a) Component | *5 | G1 | *6 | J |
| | 21.6 | 93.6 | 48.8 | 25.6 |
| (c) Component | — | 5.0 Diaryl phthalate | — | — |
| Inorganic filler | 75.0 | — | 50.0 | 73.0 |
| Curing catalyst | 0.2 | 0.2 | — | 0.2 |
| Adhesion-promoting agent | — | — | — | — |
| Release agent | 0.5 | 0.5 | 0.5 | 0.5 |
| Pigment | 0.4 | 0.4 | 0.4 | 0.4 |
| Surface treatment agent | 0.3 | 0.3 | 0.3 | 0.3 |
| Flame retardant | 2.0 | — | — | — |

*1 The same in chemical structure with the polymer represented by B of (a) Component (n = 1: m.p. = 70–80° C.)
*2 Epoxy resin
*3 Zr chelate
*4 Unsaturated polyester
*5 (a) Component not contained. Epoxy resin (the same with *2) and phenol resin were employed in place of (a) component.
*6 (a) Component not contained. Polyphenylene sulfide resin was used in place of (a) Component.
*7 2,2-bis[4-(4-maleimidephenoxy)phenyl]propane was employed as (c) Component in place of triallyl trimellitate At the occasion of preparing the resin compositions, the inorganic filler was first treated using a surface treatment agent in a Henshel mixer. Then, each of the resin components, a curing catalyst and an adhesion-promoting agent shown in Table 16 were thermally fused thereby homogeneously mixing them, then cooled and pulverized. Then, the whole components were mixed together and kneaded using a heating roller heated to 60 to 130°, the resultant kneaded material being subsequently cooled and pulverized to obtain a resin composition. However, the composition of Comparative Example 10 was kneaded at a temperature of 310° C.

The followings explain specific materials employed for each component shown in Table 16.

Epoxy resin: o-cresol novolak epoxy resin (ESCN 195XL, Sumitomo Kagaku Co., equivalent weight:197)

{In the case of Comparative Examples, this epoxy resin was mixed with the following curing agent: Curing agent: phenol novolak resin (BRG-557, Shouwa Kobunshi Co., equivalent weight:104) Curing agent/epoxy resin=0.95 (hydroxyl/epoxy)}

Polyphenylene sulfide resin: (Aldrich reagent, Mn 10,000, Tm 285° C.)

Curing catalyst: di-tert-butyl peroxide (however, triphenyl sulfone was employed in Comparative Example 8)
Release agent: carnauba wax
Pigment: carbon black (CB-30, Mitsubishi Kasei Co.)
Flame retardant: antimony trioxide
Inorganic filler: fused silica powder (average particle diameter:205 m)
Surface treatment agent: γ-glycidoxypropyltrimethoxy silane (A-187, Nihon Unika Co.)
Zr chelate: zirconium acetylacetate (Dojin Kagaku Shiyaku Co.)

The following evaluation tests were conducted on the resin compositions of these Examples 22 to 30 and Comparative Examples 8 to 11.

(1) Flexural modulus, flexural strength, thermal expansion coefficient, glass transition point, water absorption and adhesion strength:

The tests were performed in the same manner as in the cases of Examples 1 to 8 thereby measuring and evaluating the flexural modulus, flexural strength, thermal expansion coefficient, glass transition point, water absorption and adhesion strength on each test piece. The results obtained by these tests are shown in Table 17 below.

TABLE 17

|  | Examples |  |  |  |  |  |  |  |  | Comparative Examples |  |  |  |
|---|---|---|---|---|---|---|---|---|---|---|---|---|---|
|  | 22 | 23 | 24 | 25 | 26 | 27 | 28 | 29 | 30 | 8 | 9 | 10 | 11 |
| Flexural modulus (kg/mm$^2$) | 1280 | 1200 | 1200 | 1320 | 1290 | 1250 | 1330 | 1290 | 1280 | 1210 | 210 | 1000 | 1300 |
| Flexural strength (kg/mm$^2$) | 11.5 | 12.0 | 11.2 | 12.8 | 12.5 | 12.0 | 13.0 | 12.0 | 11.9 | 8.6 | 6.0 | 9.8 | 12.8 |
| Thermal expansion coefficient (1/deg) × 10$^5$ | 1.5 | 1.5 | 1.9 | 1.7 | 1.5 | 1.6 | 1.4 | 1.5 | 1.6 | 1.8 | 6.6 | 3.2 | 1.7 |
| Glass transition point (°C.) | 180 | 185 | 180 | 210 | 190 | 180 | 215 | 185 | 210 | 155 | 150 | 95 | 215 |
| Water absorption (wt. %) | 0.20 | 0.20 | 0.25 | 0.23 | 0.21 | 0.22 | 0.19 | 0.21 | 0.24 | 0.60 | 0.57 | 0.32 | 0.23 |
| Adhesion strength (kg/cm$^2$) | 2.0 | 2.1 | 3.8 | 2.5 | 3.0 | 3.2 | 2.2 | 2.0 | 2.3 | 3.3 | 2.8 | 2.0 | 2.4 |

As clear from Table 17, the cured materials of the resin compositions of this invention (Examples 22 to 30) exhibited an excellent result in all of these features. Whereas, the cured materials of the resin compositions of Comparative Examples 8 to 11 failed to exhibit an excellent result in all of these features. Namely, the cured material of the resin composition of Comparative Example 8 showed a lower flexural strength and a higher water absorption as compared with the cured materials of resin compositions of Examples of this invention due to the employment of the epoxy resin in place of polyarylene polyether. In the case of Comparative Example 9, since it does not contain inorganic filler, the flexural modulus and flexural strength thereof were inferior and the thermal expansion coefficient and water absorption thereof were higher as compared with the cured materials of resin compositions of Examples of this invention. Further, in the case of Comparative Example 10, since it employed polyphenylene sulfide resin in place of polyarylene polyether, the melt viscosity becomes higher and the amount of inorganic filler could not be increased, so that the flexural strength thereof was inferior, the thermal expansion coefficient thereof was higher and the glass transition point thereof was low as compared with the cured materials of resin compositions of Examples of this invention.

(2) Moisture resistance:

For the purpose of investigating the moisture resistance of these resin compositions, the PCT test was performed in the same manner as in the case of Examples 1 to 8.

(3) Thermal shock resistance:

For the purpose of investigating the thermal shock resistance of these resin compositions, the TCT test was performed in the same manner as in the case of Examples 1 to 8.

The results of these PCT test and TCT test are summarized in Table 18 below.

TABLE 18

|  |  | Examples |  |  |  |  |  |  |
|---|---|---|---|---|---|---|---|---|
|  |  | 22 | 23 | 24 | 25 | 26 | 27 | 28 |
| PCT test | Crack generation ratio after moisturizing test Defective percent | 0/20 | 0/20 | 0/20 | 0/20 | 0/20 | 1/20 | 0/20 |
|  | 100 hours | 0/20 | 0/20 | 0/20 | 0/20 | 0/20 | 1/20 | 0/20 |
|  | 200 hours | 0/20 | 0/20 | 0/20 | 0/20 | 0/20 | 1/20 | 0/20 |
|  | 300 hours | 0/20 | 1/20 | 2/20 | 0/20 | 1/20 | 3/20 | 0/20 |
|  | 400 hours | 0/20 | 1/20 | 0/20 | 1/20 | 0/20 | 5/20 | 0/20 |
|  | 500 hours | 2/20 | 4/20 | 0/20 | 1/20 | 4/20 | 5/20 | 0/20 |
| TCT test | 50 cycles | 0/20 | 0/20 | 0/20 | 0/20 | 0/20 | 0/20 | 0/20 |
|  | 100 cycles | 0/20 | 0/20 | 0/20 | 0/20 | 0/20 | 0/20 | 1/20 |
|  | 200 cycles | 0/20 | 1/20 | 3/20 | 0/20 | 0/20 | 2/20 | 1/20 |
|  | 300 cycles | 1/20 | 2/20 | 5/20 | 1/20 | 0/20 | 2/20 | 2/25 |
|  | 400 cycles | 1/20 | 2/20 | 5/20 | 1/20 | 1/20 | 3/20 | 2/25 |

|  |  | Examples |  | Comparative Examples |  |  |  |
|---|---|---|---|---|---|---|---|
|  |  | 29 | 30 | 8 | 9 | 10 | 11 |
| PCT test | Crack generation ratio after moisturizing test Defective percent | 2/20 | 0/20 | 8/20 | 10/20 | 0/20 | 0/20 |
|  | 100 hours | 2/20 | 0/20 | 11/20 | 13/20 | 18/20 | 17/20 |
|  | 200 hours | 2/20 | 0/20 | 18/20 | 17/20 | 20/20 | 20/20 |
|  | 300 hours | 2/20 | 2/20 | 20/20 | 20/20 | — | — |
|  | 400 hours | 5/20 | 3/20 | — | — | — | — |
|  | 500 hours | 7/20 | 5/20 | — | — | — | — |

TABLE 18-continued

| TCT test | 50 cycles | 2/20 | 0/20 | 8/20 | 20/20 | 16/20 | 12/10 |
|---|---|---|---|---|---|---|---|
|  | 100 cycles | 2/20 | 2/20 | 10/20 | — | 20/20 | 20/20 |
|  | 200 cycles | 3/20 | 7/20 | 17/20 | — | — | — |
|  | 300 cycles | 5/20 | 7/20 | 20/20 | — | — | — |
|  | 400 cycles | 8/20 | 9/20 | — | — | — | — |

The numbers shown represent (Number of defective/Number of samples)

As apparent from Table 18, in the PCT test, almost any defective was not found in the resin-molded semiconductor devices according to Examples of this invention even if the resin-molded semiconductor devices were left in a saturated water vapor atmosphere for 500 hours. In the TCT test also, almost any defective was not found in the resin-molded semiconductor devices according to Examples of this invention even if the resin-molded semiconductor devices were subjected to the thermal shock cycle which was repeated 400 times.

By contrast, in the case of the resin-molded semiconductor devices according to Comparative Examples 8 to 11, the percent defective thereof in the PCT test as well as in the TCT test was found to be relatively high. In particular, in the case of the resin-molded semiconductor device according to Comparative Example 9, the percent defective thereof in the PCT test was found to be relatively high due to its high water absorption, and at the same time, the percent defective thereof in the TCT test was also found to be relatively high due to its high thermal expansion coefficient.

When the defective in the Comparative Example 10 was analyzed, the interconnecting wiring of the semiconductor device was found as being deformed or fractured due to the high melt viscosity of the resin composition thereof.

The resin compositions of Examples 29 and 30 were prepared by using the same materials as those employed in the resin compositions of Examples 23 and 25 respectively except that the content of impurities in the polyarylene polyether was higher than that in the polyarylene polyethers of Examples 23 and 25. When the results between these Examples are compared with each other, the resin compositions of Examples 23 and 25 containing less content of impurities give a lower percent defective respectively as compared with the resin composition of Examples 29 and 30.

When the resin compositions of Examples 22 and 27 which contain no flame retardant were subjected to a flammability test, they indicated V-0 in the UL standard, thus indicating a satisfactory flame resistance. Since the disposal of a resin containing a flame retardant such as antimony or bromides is known to be rather difficult raising an environmental problem, the resin composition according to this invention which exhibits a satisfactory flame resistance even though it contains no flame retardant would be also very advantageous in the disposal thereof.

EXAMPLES 31 TO 40

In these Examples, the polyarylene polyethers represented by the aforementioned formulas (12) to (18) were employed as the (a) component in the resin composition according to the fifth embodiment of this invention.

Synthesis 1

The method of synthesizing polyarylene polyethers employed in these Examples will be explained taking the polyarylene polyether represented by the formula (12) as an example out of the compound represented by the formula (a).

A stirrer, a thermometer and a moisture meter equipped with a cooling tube were attached to a 3,000 ml four-necked flask. Then, 0.90 mole (205.46 g) of bisphenol A and 0.10 mole (25.05 g) of 1,3-bis(3-hydroxy propyl)1,1,3,3-tetramethyl disiloxane were charged in this flask, and subsequently dissolved by the addition of 700 ml of N-methylpyrolidone. Then, 80 g of sodium hydroxide was dissolved in 240 ml of water to form a solution, which is then added together with 100 ml of toluene to the solution containing bisphenol A. Then, the resultant solution was heated with stirring for 2 hours at a temperature of 150° C. while azeotropically removing water together with toluene, whereby obtaining a mixture of a sodium salt of bisphenol A and a sodium salt of 1,3-bis(3-hydroxy propyl)1,1,3,3-tetramethyl disiloxane.

To this reaction solution was added 100 ml of toluene together with 0.8 mole (229.73 g) of 4,4'-diphenyldichloro sulfone dissolved in 700 ml of N-methylpyrolidone. The resultant solution was heated at a temperature of 160° C. with stirring for 10 hours thereby allowing a reaction of the solution to take place while azeotropically removing water together with toluene, and then toluene was distilled off to obtain a polysulfone having a sodium salt as a terminal group.

After cooling the reaction solution down to room temperature, 0.60 mole of vinylbenzyl chloride was added to the reaction solution, and then the resultant solution was allowed to react for 5 hours at a temperature of 60° C. After the reaction solution was diluted by the addition of N-methylpyrolidone, salts therein were filtered off. The filtrate was then dripped into 10 liters of water, precipitating a polymer, which was then collected through filtration. The polymer thus obtained was dissolved into 1 liter of dichloromethane and washed with 300 ml of 1% aqueous solution of oxalic acid. After repeating this washing treatment twice, the polymer solution was further washed three times with 300 ml of water.

Subsequently, this polymer solution was poured into 10 liters of methanol thereby to precipitate the polymer, which was then collected through filtration and dried over 24 hours in a vacuum dryer heated to 50° C., whereby obtaining 296 g of light yellowish powdery polymer. The sodium ion concentration and chlorine ion concentration of the polymer before the washing treatments with oxalic acid and water were 41 ppm and 520 ppm, respectively. Whereas, the sodium ion concentration and chlorine ion concentration of the polymer after the washing treatments were 0.8 ppm and 12 ppm respectively, indicating an enormous reduction in impurity concentration.

Synthesis 2

The method of synthesizing polyarylene polyethers employed in these Examples will be explained taking the polyarylene polyether represented by the formula (13) as an example out of the compound represented by the formula (10).

A stirrer, a thermometer and a moisture meter equipped with a cooling tube were attached to a 3,000 ml four-necked flask. Then, one mole (228.29 g) of bisphenol A and 700 ml of N-methylpyrolidone were charged in this flask, and subsequently dissolved. Then, 80 g of sodium hydroxide was dissolved in 240 ml of water to form a solution, which is then added together with 100 ml of toluene to the solution of bisphenol A. Then, the resultant solution was heated with stirring for 2 hours at a temperature of 150° C. while azeotropically removing water together with toluene, whereby obtaining a sodium salt of bisphenol A.

To this reaction solution was added 100 ml of toluene together with 0.65 g (43.11 g) of 4,4'-diphenyldichloro sulfone and 0.15 mole (43.11 g) of 1,3-bis(3-chloropropyl) 1,1,3,3-tetramethyl disiloxane dissolved in 700 ml of N-methylpyrolidone. The resultant solution was heated at a temperature of 160° C. with stirring for 10 hours thereby allowing a reaction of the solution to take place while azeotropically removing water together with toluene, and then toluene was distilled off to obtain a polysulfone having a sodium salt as a terminated group. After cooling the reaction solution down to room temperature, 0.60 mole (72.59 g) of allyl bromide was added to the reaction solution, and then the resultant solution was allowed to react for 5 hours at a temperature of 60° C.

After the reaction solution was diluted by the addition of N-methylpyrolidone, salts therein were filtered off. The filtrate was then dripped into 10 liters of water, precipitating a polymer, which was then collected through filtration. The polymer thus obtained was dissolved into 1 liter of dichloromethane and washed with 300 ml of 1% aqueous solution of oxalic acid. After repeating this washing treatment twice, the polymer solution was further washed three times with 300 ml of water.

Subsequently, this polymer solution was poured into 10 liters of methanol thereby to precipitate the polymer, which was then collected through filtration and dried over 24 hours in a vacuum dryer heated to 50° C., whereby obtaining 310 g of light yellowish powdery polymer. The sodium ion concentration and chlorine ion concentration of the polymer before the washing treatments with oxalic acid and water were 60 ppm and 490 ppm, respectively. Whereas, the sodium ion concentration and chlorine ion concentration of the polymer after the washing treatments were 0.9 ppm and 10 ppm respectively, indicating an enormous reduction in impurity concentration.

Synthesis 3

The method of synthesizing polyarylene polyethers employed in these Examples will be explained taking the polyarylene polyether represented by the formula (18) as an example out of the compound represented by the formula (11).

A stirrer, a thermometer and a moisture meter equipped with a cooling tube were attached to a 3,000 ml four-necked flask. Then, 0.90 mole (205.46 g) of bisphenol A was charged in this flask, and subsequently dissolved by the addition of 700 ml of N-methylpyrolidone. Then, 80 g of sodium hydroxide was dissolved in 240 ml of water to form a solution, which is then added together with 100 ml of toluene to the solution of bisphenol A. After cooling the solution down to romm temperature, 0.10 mole (24.54 g) of 1,1,3,3,5,5-hexamethyl-1,5-dichloro trisiloxane dissolved in 100 ml of N-methyl pyrolidone was dripped to the solution, and the resultant solution was stirred for one hour. Then, the resultant solution was heated with stirring for 2 hours at a temperature of 150° C. while azeotropically removing water together with toluene, whereby obtaining a sodium salt of bisphenol A.

To this reaction solution was added 100 ml of toluene together with 0.7 mole (201,01 g) of 4,4'-diphenyldichloro sulfone dissolved in 700 ml of N-methylpyrolidone. The resultant solution was heated at a temperature of 160° C. with stirring for 10 hours thereby allowing a reaction of the solution to take place while azeotropically removing water together with toluene, and then toluene was distilled off to obtain a polysulfone having a sodium salt as a terminal group. After cooling the reaction solution down to room temperature, 0.60 mole (72.59 g) of allyl bromide was added to the reaction solution, and then the resultant solution was allowed to react for 5 hours at a temperature of 60° C.

After the reaction solution was diluted by the addition of N-methylpyrolidone, salts therein were filtered off. The filtrate was then dripped into 10 liters of water, precipitating a polymer, which was then collected through filtration. The polymer thus obtained was dissolved into 1 liter of dichloromethane and washed with 300 ml of 1% aqueous solution of oxalic acid. After repeating this washing treatment twice, the polymer solution was further washed three times with 300 ml of water.

Subsequently, this polymer solution was poured into 10 liters of methanol thereby to precipitate the polymer, which was then collected through filtration and dried over 24 hours in a vacuum dryer heated to 50° C., whereby obtaining 310 g of light yellowish powdery polymer.

Likewise, four kinds of compounds represented by the formulas (14) to (17) were synthesized. The Compounds (12') and (13') were the same with the Compounds (12) and (13) in chemical structure but differ in the content of impurities. The contents of impurities in these compounds as measured are summarized in Table 19 below.

TABLE 19

| Compounds of | Content of impurities (ppm) | |
|---|---|---|
| (a) impurities | Na | Cl |
| (12) | 0.8 | 12 |
| (13) | 0.9 | 10 |
| (14) | 0.6 | 12 |
| (15) | 0.5 | 20 |
| (16) | 0.7 | 10 |
| (17) | 1.5 | 18 |
| (18) | 2.0 | 25 |
| (12') | 41 | 520 |
| (13') | 60 | 490 |

Next, the preparation of the resin compositions according to the fifth embodiment of this invention will be explained as follows. First of all, the compound (12) constituting the component (a), an inorganic filler constituting the component (b), a curing catalyst, a release agent, a pigment, a surface, a flame retardant and a reactive treatment agent were mixed in the ratios as shown in Table 20 to prepare the resin compositions of Example 31. Likewise, the compound constituting the (a) component and mixing ratios of each component were altered to prepare the resin compositions of Examples 32 to 40. Moreover, the resin compositions of Comparative Examples 12 to 14 were prepared, the mixing ratios thereof being shown in Table 20 and 21 below.

TABLE 20

| | Examples (parts by weight) | | | | | | | | | |
|---|---|---|---|---|---|---|---|---|---|---|
| | 31 | 32 | 33 | 34 | 35 | 36 | 37 | 38 | 39 | 40 |
| (a) Component | (12) | (13) | (14) | (15) | (16) | (17) | (18) | (12) | (12') | (13') |
| | 28.6 | 18.6 | 25.1 | 28.4 | 18.9 | 20.1 | 19.6 | 14.9 | 28.6 | 18.6 |
| (b) Component Inorganic filler | 70.0 | 80.0 | 65.0 | 70.0 | 75.0 | 75.0 | 77.0 | 80.0 | 70.0 | 80.0 |
| Curing *1 catalyst | 0.2 | 0.2 | 0.2 | 0.2 | 0.2 | 0.2 | 0.2 | 0.2 | 0.2 | 0.2 |
| Adhesion-promoting agent | — | — | *2 6.5 | *3 0.2 | — | — | — | — | — | — |
| Reactive diluent | — | — | — | — | *4 4.7 | — | — | *4 3.7 | — | — |
| Curing agent | — | — | — | — | — | *5 3.5 | — | — | — | — |
| Release agent | 0.5 | 0.5 | 0.5 | 0.5 | 0.5 | 0.5 | 0.5 | 0.5 | 0.5 | 0.5 |
| Pigment | 0.4 | 0.4 | 0.4 | 0.4 | 0.4 | 0.4 | 0.4 | 0.4 | 0.4 | 0.4 |
| Surface treatment agent | 0.3 | 0.3 | 0.3 | 0.3 | 0.3 | 0.3 | 0.3 | 0.3 | 0.3 | 0.3 |
| Flame retardant | — | — | 2.0 | — | — | — | 2.0 | — | — | — |

*1: Dicumyl peroxide (tri-phenyl phosphine in Example 5)
*2: 2,2-bis( 4-phenoxyphenyl-4 -maleimide)propane
*3: Tetrakisacetylacetonato zirconium
*4: Diallyl phthalate
*5: Novolac resin (Shounol BRG-555, Shouwa Kobunshi Co.,)

TABLE 21

| | Comparative Example (part by weight) | | |
|---|---|---|---|
| | 12 | 13 | 14 |
| (a) Component | *1 9.5 | A 96.6 | *5 58.8 |
| (b) Component Inorganic filler | 80.0 | — | 40.0 |
| Curing catalyst | *2 0.2 | *4 0.2 | — |
| Adhesion-promoting agent | — | — | — |
| Reactive diluent | — | — | — |
| Curing agent | *3 7.1 | — | — |
| Release agent | 0.5 | 0.5 | 0.5 |
| Pigment | 0.4 | 0.4 | 0.4 |
| Surface treatment agent | 0.3 | 0.3 | 0.3 |
| Flame retardant | 2.0 | 2.0 | — |

*1: epoxy resin (epoxy equivalent: 200)
*2: triphenyl phosphine
*3: phenol novolac resing (phenol equivalent: 160)
*4: dicumyl peroxide
*5: polyphenylene sulfide resin At the occasion of preparing the resin compositions, the inorganic filler was first treated using a surface treatment agent in a Henshel mixer. Then, each of the resin components, a curing catalyst, a curing agent and an adhesion-promoting agent shown in Table 6 were thermally fused thereby homogeneously mixing them, then cooled and pulverized. Then, the whole components were mixed together and kneaded using a heating roller heated to 60 to 160°, the resultant kneaded material being subsequently cooled and pulverized to obtain a resin composition. The resin composition of Comparative Example 14 is kneaded at a temperature of 310° C.

The followings explain specific materials employed for each component shown in Tables 20 and 21.

Curing catalyst: triphenyl sulfone

Release agent: carnauba wax

Pigment: carbon black

Flame retardant: antimony trioxide

Surface treatment agent: γ-glycidoxypropyltrimethl silane (A-187, Nihon Unika Co.)

The following evaluation tests were conducted on the resin compositions of these Examples 31 to 40 and Comparative Examples 12 to 14.

(1) Flexural modulus, flexural strength, thermal expansion coefficient, glass transition point, water absorption and adhesion strength:

The tests were performed in the same manner as in the cases of Examples 1 to 8 thereby measuring and evaluating the flexural modulus, flexural strength, thermal expansion coefficient, glass transition point, water absorption and adhesion strength on each test piece. The results obtained by these tests are shown in Tables 22 and 23 below.

TABLE 22

| | Examples | | | | | | | | | |
|---|---|---|---|---|---|---|---|---|---|---|
| | 31 | 32 | 33 | 34 | 35 | 36 | 37 | 38 | 39 | 40 |
| Flexural modulus (kg/m$^2$) | 1220 | 1350 | 1080 | 1160 | 1240 | 1050 | 1100 | 1230 | 1190 | 1330 |
| Flexural strength (kg/m$^2$) | 11.5 | 10.8 | 10.2 | 11.1 | 11.5 | 10.7 | 11.3 | 12.0 | 11.3 | 10.6 |

TABLE 22-continued

| | Examples | | | | | | | | | |
|---|---|---|---|---|---|---|---|---|---|---|
| | 31 | 32 | 33 | 34 | 35 | 36 | 37 | 38 | 39 | 40 |
| Thermal expansion coefficient (1/deg) × 10$^5$ | 1.5 | 1.2 | 1.9 | 1.6 | 1.4 | 1.4 | 1.3 | 1.2 | 1.5 | 1.2 |
| Glass transition point (°C.) | 137 | 134 | 140 | 142 | 137 | 118 | 126 | 140 | 137 | 131 |
| Water absorption (wt. %) | 0.28 | 0.25 | 0.32 | 0.31 | 0.27 | 0.35 | 0.25 | 0.25 | 0.29 | 0.25 |
| Adhesion strength (kg/cm$^2$) | 2.7 | 2.8 | 3.0 | 2.9 | 2.4 | 2.3 | 2.5 | 2.5 | 2.6 | 2.7 |

TABLE 23

| | Comparative examples | | |
|---|---|---|---|
| | 12 | 13 | 14 |
| Flexural modulus (Kg/mm$^1$) | 1200 | 320 | 520 |
| Flexural strength (Kg/mm$^2$) | 10.1 | 6.0 | 3.0 |
| Thermal expansion coefficient (1/deg) × 10$^5$ | 1.5 | 7.0 | 1.6 |
| Glass transition point (°C.) | 107 | 133 | 85 |
| Water absorption (wt.%) | 0.51 | 0.80 | 0.33 |
| Adhesion strength (Kg/cm$^2$) | 1.2 | 1.1 | 0.8 |

As clear from Tables 22 and 23, the cured materials of the resin compositions of this invention (Examples 31 to 40) exhibited an excellent result in all of these features. Whereas, the cured materials of the resin compositions of Comparative Examples 12 to 14 failed to exhibit an excellent result in all of these features. Namely, the cured material of the resin composition of Comparative Example 12 showed and a higher water absorption as compared with the cured materials of resin compositions of Examples of this invention due to the employment of the epoxy resin in place of polyarylene polyether. In the case of Comparative Example 13, since it does not contain inorganic filler, the flexural modulus and flexural strength thereof were inferior and the thermal expansion coefficient and water absorption thereof were higher as compared with the cured materials of resin compositions of Examples of this invention. Further, in the case of Comparative Example 14, since it employed polyphenylene sulfide resin in place of polyarylene polyether, the melt viscosity becomes higher and the amount of inorganic filler could not be increased, so that the flexural strength thereof was inferior, and the glass transition point thereof was low as compared with the cured materials of resin compositions of Examples of this invention.

(2) Moisture resistance:

For the purpose of investigating the moisture resistance of these resin compositions, the PCT test was performed in the same manner as in the case of Examples 1 to 8.

(3) Thermal shock resistance:

For the purpose of investigating the thermal shock resistance of these resin compositions, the TCT test was performed in the same manner as in the case of Examples 1 to 8.

The results of these PCT test and TCT test are summarized in Tables 24 and 25 below.

TABLE 24

| | | Examples | | | | | | | | | |
|---|---|---|---|---|---|---|---|---|---|---|---|
| | | 31 | 32 | 33 | 34 | 35 | 36 | 37 | 38 | 39 | 40 |
| PCT test | Crack generation ratio after moisturizing test Defective percent | 0/20 | 0/20 | 0/20 | 0/20 | 0/20 | 1/20 | 0/20 | 0/20 | 2/20 | 1/20 |
| | 100 hours | 0/20 | 0/20 | 0/20 | 0/20 | 0/20 | 1/20 | 1/20 | 0/20 | 2/20 | 0/20 |
| | 200 hours | 0/20 | 0/20 | 0/20 | 0/20 | 1/20 | 1/20 | 2/20 | 0/20 | 4/20 | 3/20 |
| | 300 hours | 0/20 | 1/20 | 2/20 | 1/20 | 1/20 | 3/20 | 3/20 | 1/20 | 8/20 | 6/20 |
| | 400 hours | 2/20 | 1/20 | 4/20 | 2/20 | 3/20 | 5/20 | 5/20 | 2/20 | 10/20 | 6/20 |
| | 500 hours | 3/20 | 2/20 | 6/20 | 5/20 | 5/20 | 5/20 | 7/20 | 3/20 | 12/20 | 9/20 |
| TCT test | 50 cycles | 0/20 | 0/20 | 0/20 | 0/20 | 0/20 | 0/20 | 0/20 | 0/20 | 0/20 | 0/20 |
| | 100 cycles | 0/20 | 0/20 | 0/20 | 0/20 | 0/20 | 0/20 | 1/20 | 1/20 | 2/20 | 0/20 |
| | 200 cycles | 0/20 | 0/20 | 2/20 | 0/20 | 0/20 | 2/20 | 1/20 | 1/20 | 3/20 | 1/20 |
| | 300 cycles | 1/20 | 2/20 | 2/20 | 1/20 | 0/20 | 2/20 | 2/25 | 1/20 | 3/20 | 3/20 |
| | 400 cycles | 1/20 | 2/20 | 4/40 | 1/20 | 1/20 | 2/20 | 2/25 | 1/20 | 4/20 | 5/20 |

TABLE 25

| | | Comparative Examples | | |
|---|---|---|---|---|
| | | 12 | 13 | 14 |
| PCT test | Crack generation ratio after moisturizing test | 6/20 | 12/20 | 3/20 |

TABLE 25-continued

|  |  | Comparative Examples | | |
|---|---|---|---|---|
|  |  | 12 | 13 | 14 |
|  | Defective percent | | | |
|  | 100 hours | 7/20 | 13/20 | 5/20 |
|  | 200 hours | 11/20 | 20/20 | 7/20 |
|  | 300 hours | 18/20 | — | 14/20 |
|  | 400 hours | 20/20 | — | 20/20 |
|  | 500 hours | | | |
| TCT test | 50 cycles | 17/20 | 14/20 | 2/20 |
|  | 100 cycles | 20/20 | 16/20 | 5/20 |
|  | 200 cycles | — | 20/20 | 12/20 |
|  | 300 cycles | — | — | 20/20 |
|  | 400 cycles | — | — | — |

As apparent from Tables 24 and 25, in the PCT test, almost any defective was not found in the resin-molded semiconductor devices according to Examples of this invention even if the resin-molded semiconductor devices were left in a saturated water vapor atmosphere for 500 hours. In the TCT test also, almost any defective was not found in the resin-molded semiconductor devices according to Examples of this invention even if the resin-molded semiconductor devices were subjected to the thermal shock cycle which was repeated 400 times.

By contrast, in the case of the resin-molded semiconductor devices according to Comparative Examples 12 to 14, the percent defective thereof in the PCT test as well as in the TCT test was found to be relatively high. In particular, in the case of the resin-molded semiconductor device according to Comparative Example 13, the percent defective thereof in the PCT test was found to be relatively high due to its high water absorption. And in the case of the resin-molded semiconductor device according to Comparative Example 12, the percent defective thereof in the TCT test was found to be relatively high due to its high thermal expansion coefficient.

The resin compositions of Examples 39 and 40 were prepared by using the same materials as those employed in the resin compositions of Examples 33 and 35 respectively except that the content of impurities in the polyarylene polyether was higher than that in the polyarylene polyethers of Examples 33 and 35. When the results between these Examples are compared with each other, the resin compositions of Examples 33 and 35 containing less content of impurities give a lower percent defective respectively as compared with the resin composition of Examples 39 and 40.

When the resin compositions of Examples 31 and 32 which contain no flame retardant were subjected to a flammability test, they indicated V-0 in the UL standard, thus indicating a satisfactory flame resistance. Since the disposal of a resin containing a flame retardant such as antimony or bromides is known to be rather difficult raising an environmental problem, the resin composition according to this invention which exhibits a satisfactory flame resistance even though it contains no flame retardant would be also very advantageous in the disposal thereof.

As explained above, it is possible according to this invention is to provide a resin composition which is excellent in moldability and heat resistance, and at the same time low in hygroscopicity. Further, it is also possible according to this invention to provide a resin-molded type semiconductor device which is excellent in heat resistance and thermal shock resistance, and at the same time high in anti-moisture reliability by making use of the cured material of the resin composition of this invention for the seal of a semiconductor element.

What is claimed is:

1. A resin composition comprising:

(a) polyarylene polyether represented by the general formula of $Z_1$-(polyarylene polyether) chain-$Z_{1'}$ wherein $Z_1$ and $Z_{1'}$ denote individually a monovalent organic group containing a cross-linkable unsaturated carbon-carbon linkage;

(b) an inorganic filler; and (c) a compound containing at least one organic group having a cross-linkable unsaturated carbon-carbon linkage in its molecule, said compound having a molecular weight of 5,000 or less;

wherein the content of alkaline metal in said (a) component is 50 ppm or less, and the content of halogen in said (a) component is 500 ppm or less.

2. The resin composition according to claim 1, wherein a melting point of said (c) component is 200° C. or less.

3. The resin composition according to claim 1, which further comprises an adhesion-promoting agent.

4. A resin composition for sealing a semiconductor chip, comprising:

(a) a polyarylene polyether represented by the general formula of $Z_1$-(polyarylene polyether) chain-$Z_{1'}$ wherein $Z_1$ and $Z_{1'}$ denote individually a monovalent organic group containing a cross-linkable unsaturated carbon-carbon linkage; and (b) an inorganic filler, wherein a content of alkaline metal in said (a) component is 50 ppm or less, and a content of halogens in said (b) component is 500 ppm or less.

5. The resin composition according to claim 4, which further comprises a maleimide resin.

6. The resin composition according to claim 5, which further comprises a curing agent for the maleimide resin.

7. The resin composition according to claim 4, which further comprises an adhesion-promoting agent.

8. The resin composition according to claim 4, wherein said inorganic filler is at least one selected from the group consisting of quartz glass, crystalline silica, fused silica, zircon, alumina, calcium silicate, barium sulfate, magnesite, clay, kaolin, talc, mica, glass fibers, ceramic fibers, silicon carbide, silicon nitride, aluminum nitride, titanium white, calcium carbonate, and gypsum.

9. The resin composition according to claim 1, wherein said inorganic filler is at least one selected from the group consisting of quartz glass, crystalline silica, fused silica, zircon, alumina, calcium silicate, barium sulfate, magnesite, clay, kaolin, talc, mica, glass fibers, ceramic fibers, silicon carbide, silicon nitride, aluminum nitride, titanium white, calcium carbonate, and gypsum.

10. The resin composition according to claim 8, wherein said inorganic filler is selected from the group consisting of alumina and silicon.

11. The resin composition according to claim 9, wherein said inorganic filler is selected from the group consisting of alumina and silicon.

12. The resin composition of claim 1, wherein said inorganic filler is present in an amount of 40–95 parts by weight per 100 parts by weight of the entire resin composition.

13. The resin composition according to claim 1, which further comprises an adhesion-promoting agent.

14. The resin composition according to claim 4, wherein said inorganic filler is present in an amount of 80–95 parts by weight of the entire resin composition.

* * * * *